United States Patent
Kondo et al.

(10) Patent No.: US 7,787,773 B1
(45) Date of Patent: Aug. 31, 2010

(54) RADIO OSCILLATING AND RADAR SYSTEMS

(75) Inventors: Jungo Kondo, Nishikamo-Gun (JP); Osamu Mitomi, Nagoya (JP); Kenji Aoki, Ogaki (JP); Yuichi Iwata, Nagoya (JP); Tetsuya Ejiri, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 939 days.

(21) Appl. No.: 11/520,987

(22) Filed: Sep. 14, 2006

(30) Foreign Application Priority Data

Sep. 16, 2005 (JP) .............................. 2005-270612

(51) Int. Cl.
*H04B 10/00* (2006.01)
(52) U.S. Cl. ..................... 398/115; 398/211; 398/212
(58) Field of Classification Search ................... 398/95, 398/96, 115, 116, 211, 212
See application file for complete search history.

(56) References Cited

U.S. PATENT DOCUMENTS

| | | | |
|---|---|---|---|
| 5,991,067 A | 11/1999 | Minakata et al. | |
| 6,400,494 B1 | 6/2002 | Kondo et al. | |
| 6,571,026 B2 | 5/2003 | Kondo et al. | |
| 6,819,851 B2 | 11/2004 | Aoki et al. | |
| 7,446,696 B2 * | 11/2008 | Kondo et al. | 342/52 |
| 2002/0111150 A1 * | 8/2002 | Pleasant et al. | 455/313 |
| 2002/0175776 A1 * | 11/2002 | Pleasant et al. | 333/17.1 |
| 2005/0211875 A1 * | 9/2005 | Kawanishi et al. | 250/208.1 |

FOREIGN PATENT DOCUMENTS

| | | |
|---|---|---|
| JP | 09-211402 A1 | 8/1997 |
| JP | 10-082921 A1 | 3/1998 |
| JP | 2001-066561 A1 | 3/2001 |
| JP | 2001-235714 A1 | 8/2001 |
| JP | 2002-162465 A1 | 6/2002 |
| JP | 2002-169133 A1 | 6/2002 |
| JP | 2002-357797 A1 | 12/2002 |
| WO | WO 2006/006711 A1 | 1/2006 |

OTHER PUBLICATIONS

U.S. Appl. No. 11/619,743, filed Jan. 4, 2007, Kondo et al.

* cited by examiner

*Primary Examiner*—Dzung D Tran
(74) *Attorney, Agent, or Firm*—Burr & Brown

(57) ABSTRACT

It is provided a radio oscillating system for oscillating a radio signal. The system has an optical modulator for oscillation, a modulating means for inputting a modulating signal of a frequency of fm into the optical modulator to modulate a carrier wave so as to interpose sideband waves onto the carrier wave at positions shifted with respect to the frequency of the carrier wave by the frequency "fm"; and an optical receiver for oscillation for receiving beam from the optical modulator and converting the beam into an electrical signal. The system further has a radiating means for radiating radio signal of a frequency of 2fm based on the electrical signal. An input voltage Vp-p applied on the optical modulator is 1.0 times or more and 1.99 times or less of a half-wavelength voltage $V\pi$ of the optical modulator.

7 Claims, 20 Drawing Sheets

RADIO OSCILLATING AND RADAR SYSTEMS

This application claims the benefit of Japanese Patent Application P 2005-270612 filed on Sep. 16, 2005, the entirety of which is incorporated by reference.

BACKGROUND OF THE INVENTION

1. Field of the Invention

The present invention relates to radio oscillating and radar systems.

2. Related Art Statement

In Intelligent Transport Systems (ITS), it has been widely demanded a radar system utilizing radio wave such as an on-vehicle radar system. It has recently been developed, and partly commercialized, a radar system utilizing radio wave of 76 GHz band.

An on-vehicle radar system is provided on the front side of a vehicle body so that it can measure the direction, distance and relative velocity of the car with respect to one running ahead of the car to function as a sensor for preventing the car accident. It will be strongly demanded an auto cruise system (ACC) controlling the speed of a vehicle and assuring the safety distance between cars. It is thus required to detect obstacles on the sides such as passing vehicles and a human for the lane selection and those on the back for the assistance of the parking and the prevention of the car accident, as well as obstacles ahead of the car. It has been thus increasingly demanded to fix many radars on the vehicle body.

As shown in FIG. 1, a prior millimeter-wave radar system has an FM modulator, a local oscillator, a power amplifier and multiplier, an electric divider, a transmitting antenna, a receiving antenna and a mixer. Although the RF parts are composed of MMIC, the high cost is a problem to be solved for the wide acceptance. Although it is demanded to equip a plurality of radar systems as described above, such equipment would be very difficult in a practical view because the cost of the RF parts are high as described above.

It is further necessary to reduce the distance of transmission as possible on the viewpoint of losses between the oscillator and divider and between the transmitting antenna and mixer. Since the oscillator is thus provided near the antenna, the oscillator is required to have high reliability under severe circumstances. On the other hand, it is strongly demanded to have stability of frequency, low noise intensity and low phase noise as a radar system. Both of the above demanded properties are needed to be satisfied, so as to increase the cost of the oscillator.

Japanese Patent publication No. 2002-162465A disclosed a radar system utilizing a sub-carrier light source using a mode locking laser. According to the system, incident light can be divided into a plurality of routes by means of an optical fiber and an optical divider. It is thus possible to perform multi-oscillation using a single oscillator and to considerably reduce the number of parts necessary for the RF units, so that the cost can be reduced. It is further possible to freely select the positions of oscillators, so as to relax the requirements for the oscillators and to further reduce the costs.

SUMMARY OF THE INVENTION

According to a radar system using s sub-carrier light source such as a mode locking laser system, many signals are observed at an interval according to optional longitudinal mode in the oscillation spectrum. A plurality of radio signals are inevitably generated other than the desired signal of beat frequency. The thus generated radio signals are reflected by an object. It is thus needed to provide a frequency filter on the reception side, and to demand severe specification of passing band of a filter so as to cut many unnecessary radio signals.

Further, an oscillator of 76 GHz band is necessary for generating radio signals of 76 GHz band using a mode locking laser system. Such oscillation required a high cost due to the above reasons.

The applicant thus filed PCT/JP2005/013201 and disclosed a radio oscillating system having an optical modulator for oscillation, a modulating means for modulating and interposing sideband waves on carrier wave passing through the optical modulator, an optical receiver for oscillation for receiving beam radiated by the optical modulator and for converting the beam to electrical signal, and a radio radiating means for radiating radio signal based on the electrical signal.

According to PCT/JP2005/013201, however, it is not considered the relationship between the intensity of the electrical signal, obtained by intercepting beam outgoing from the optical modulator and converting the beam to electrical signal and that of the driving signal of the optical modulator. It becomes thus necessary an electrical filter of a high precision, for processing the electrical signal outputted from the optical receiver to remove unnecessary signals without using an optical filter.

An object of the present invention is to alleviate the necessity of a reception filter of severe specification of pass band and an oscillating system and an amplifier of high performance and high reliability, in a radio oscillating system for a radar system, and to provide a radio oscillating system of improved practical use.

A first aspect of the present invention provides a radio oscillating system for oscillating radio signal: the system comprising;

an optical modulator for oscillation;

a modulating means for inputting a modulating signal of a frequency of fm into the optical modulator to modulate a carrier wave so as to interpose sideband waves onto the carrier wave at positions shifted with respect to the frequency of the carrier wave by the frequency fm;

an optical receiver for oscillation to receive beam from the optical modulator and to convert the beam into an electrical signal; and a radiating means for radiating radio signal of a frequency of 2fm based on the electrical signal, wherein an input voltage Vp-p applied on the optical modulator is 1.0 times or more and 1.99 times or less of a half-wavelength voltage Vπ of the optical modulator.

According to the first aspect of the present invention, preferably, the bandwidth of the optical receiver is higher than 2fm and lower than 4fm. The term "bandwidth" is defined as a frequency where the electric power is reduced by 3 dB and a frequency range defined by the frequency.

A second aspect of the present invention provides a radio oscillating system for oscillating a radio signal: the system comprising;

an optical modulator for oscillation;

a modulating means for inputting a modulating signal of a frequency of fm into the optical modulator to modulate a carrier wave so as to interpose sideband waves onto the carrier wave at positions shifted with respect to the frequency of the carrier wave by the frequency fm;

an optical receiver for oscillation for receiving beam from the optical modulator and for converting the beam into an electrical signal; and a radiating means for radiating radio signal of a frequency of 3fm based on the electrical signal, wherein an input voltage Vp-p applied on the optical modulator is 2.2 times or more and 2.7 times or less of a half-wavelength voltage Vπ of the optical modulator.

According to the second aspect of the present invention, preferably, the bandwidth of the optical receiver is higher than 3fm and lower than 5fm.

A third aspect of the present invention provides a radio oscillating system for oscillating a radio signal: the system comprising;

an optical modulator for oscillation;

a modulating means for inputting a modulating signal of a frequency of fm into the optical modulator to modulate a carrier wave so as to interpose sideband waves onto the carrier wave at positions shifted with respect to the frequency of the carrier wave by the frequency fm;

an optical receiver for oscillation for receiving beam from the optical modulator and for converting the beam into an electrical signal; and a radiating means for radiating a radio signal of a frequency of 4fm based on the electrical signal, wherein an input voltage Vp-p applied on the optical modulator is 2.9 times or more and 3.6 times or less of a half-wavelength voltage Vπ of the optical modulator.

According to the third aspect of the present invention, preferably, the bandwidth of the optical receiver is higher than 4fm and lower than 6fm.

A fourth aspect of the present invention provides a radio oscillating system for oscillating a radio signal: the system comprising;

an optical modulator for oscillation;

a modulating means for inputting a modulating signal of a frequency of fm into the optical modulator to modulate a carrier wave so as to interpose sideband waves onto the carrier wave at positions shifted with respect to the frequency of the carrier wave by the frequency fm;

an optical receiver for oscillation for receiving beam from the optical modulator and converting the beam into an electrical signal; and a radiating means for radiating a radio signal of a frequency of 5fm based on the electrical signal, wherein an input voltage Vp-p applied on the optical modulator is 3.7 times or more and 4.7 times or less of a half-wavelength voltage Vπ of the optical modulator.

According to the fourth aspect of the present invention, preferably, the bandwidth of the optical receiver is higher than 5fm and lower than 7fm.

Further, according to the fourth aspect of the present invention, a high-pass filter having a bandwidth higher than 3 fm is provided in the downstream of the optical receiver for oscillation.

A fifth aspect of the present invention provides a radio oscillating system for oscillating a radio signal: the system comprising;

an optical modulator for oscillation;

a modulating means for inputting a modulating signal of a frequency of fm into the optical modulator to modulate a carrier wave so as to interpose sideband waves onto the carrier wave at positions shifted with respect to the frequency of the carrier wave by the frequency fm;

an optical receiver for oscillation to receive beam from the optical modulator and to convert the beam into an electrical signal; and a radiating means for radiating a radio signal of a frequency of 6fm based on the electrical signal, wherein an input voltage Vp-p applied on the optical modulator is 4.5 times or more and 5.2 times or less of a half-wavelength voltage Vπ of the optical modulator.

According to the fifth aspect of the present invention, preferably, the bandwidth of the optical receiver is higher than 6fm and lower than 8fm.

Further, according to a fifth aspect of the present invention, a high-pass filter having a bandwidth higher than 4fm is provided in the downstream of the optical receiver for oscillation.

The present invention further provides a radar system comprising the radio oscillation system and a receiving means for receiving s signal reflected from an object, wherein information concerning the object is obtained based on the received signal and the radio signal.

The present inventors have invented a radar system using an optical modulator such as a modulator of optical intensity or phase, instead of a sub-carrier light source such as a mode locking laser. The principles are described referring to a schematic view of FIG. 2.

A radio oscillating system of FIG. 2 has a light source 1, an optical modulator 2, a power source 6 for modulation, an optical receiver 7 and a means 8 for radiating radio signal. The optical modulator 2 has an optical waveguide substrate 3, an optical waveguide 5 of a predetermined pattern provided on the substrate 3, and electrodes 4 for modulating light propagating in the optical waveguide 5.

According to the present invention, the optical modulator is used as a frequency multiplier. For example, as schematically shown in FIG. 3, in the case that the modulator is operated so that a bias voltage is applied at the maximum peak position of optical output (referred to as "on bias" below) or a bias voltage is applied at the position where the optical output is zero (referred to as "off-bias" below), a modulating signal of a frequency of fm is input into the optical modulator for oscillation. The amplitude of the modulating signal is made twice of the half-wavelength voltage Vπ of an optical modulator. A sideband wave at the interval of a frequency of fm is thereby interposed on the outgoing beam. The outgoing beam is received by an optical receiver having no sensitivity for a carrier wave having a frequency fo, so that an electrical signal of a frequency of 2fm can be obtained. The resulting signal is then inputted into a radiating means for radiating radio signal such as a transmitting antenna, so that radio signal of a frequency of 2fm can be oscillated.

Further, as shown in FIG. 4, when the modulator is operated at a bias voltage (Vb: π/2) where the optical output becomes ½ of the maximum. It is provided that a modulating signal having a frequency of fm is provided to the optical modulator for oscillation and the amplitude of the modulating signal is made "k" times of the driving voltage Vπ applied on the optical modulator. The outgoing beam may include a radio signal having a frequency of K×fm ("k" is an odd number). Further, although FIG. 4 shows the case where "k"=3, the results are substantially the same in the case where "k" is an odd number of 5 or more.

The carrier wave and outgoing beam are made incident to the receiver 7 as an arrow "B", as shown in FIG. 2. The sensitivity of the common receiver 7 cannot follow the frequency "fo" of the carrier wave, so that the receiver 7 provides electrical signal only having a frequency of k·fm. The electrical signal is input into the system 8 for radiating radio signal, so as to oscillate radio signal "C" of millimeter-wave having a frequency of, for example, k·fm.

In this case, contrary to s sub-carrier light source utilizing a mode locking laser system, many optical signals corresponding to vertical mode are not oscillated so that radio signal can be oscillated at a high efficiency.

It is thus possible to change a filter to be set in the downstream of the receiver, required in Japanese Patent publication No. 2002-162465A, to a low cost filter not requiring severe band pass property. It becomes further possible to oscillate sideband wave efficiently required for the oscillation of radio signal. It is thus possible to oscillate radio signal having an output power larger than that of a sub-carrier light source, so that the necessity of a high performance optical amplifier or electric amplifier is alleviated even when the signal is divided into plural routes. As described above, the present invention is effective for the cost reduction.

Further, according to the present invention, each of the multiplied waves of two, three, four, five and six-fold was modulated with the optical modulator and the modulated light was further opto-electrically converted with an optical receiver to electrical signal. The intensity of the electrical signal was thus studied. It was finally found that the electrical signal corresponding with a target multiplied wave can be generated and the intensity of the other unnecessary waves can be minimized, by adjusting the driving voltage Vp-p applied on the optical modulator within each range described above. It is thus possible to cut the unnecessary wave easily and to generate the target multiplied wave without the need of an electrical filter of a high precision and an optical filter. The present invention is based on the discovery.

These and other objects, features and advantages of the invention will be appreciated upon reading of the following description of the invention when taken in conjunction with the attached drawings, with the understanding that some modifications, variations and changes of the same could be easily made by the skilled person in the art.

DETAILED DESCRIPTION OF THE INVENTION

First, it will be described the optical field intensity of light oscillated from an optical modulator. This is the optical intensity of the light oscillated from the optical modulator and before the light is incident into the receiver.

Specifically, it is provided that an intensity modulator is operated at a modulation frequency of fin, a voltage of Vp-p and a bias voltage of Vb. The optical field intensity Eopt is represented by the following formula to generate sideband waves. Each reference is represented as follows.

$$E_{opt} = \sqrt{P_o} \cos\left(\frac{\pi V}{2V_\pi}\right) \exp(j\omega_o t) = \sqrt{P_o} \cdot y \cdot \exp(j\omega_o t) \quad \text{Formula 1}$$

$$V = V_b + V_m \cos\omega_m t$$

"Vb" represents a bias voltage, "Vm" represents an amplitude of driving voltage (Vp-p=2Vm), and "ωm" represents each frequency. "y" can be represented by the following formula using Bessel function.

$$y = \underbrace{\cos A \cdot \cos B \cdot \left[J_0(b) + 2\sum_{k=1}^{\infty}(-1)^k J_{2k}(b)\cos(2k\omega_m t)\right]}_{\text{First Item}} - \underbrace{\sin A \cdot \sin B \cdot \left[2\sum_{k=1}^{\infty}(-1)^k J_{2k+1}(b)\cos\{(2k+1)\omega_m t\}\right]}_{\text{Second Item}} \quad \text{Formula 2}$$

"A" and "B" are represented as follows.

$$A = \frac{\pi}{2} \cdot \frac{V_b}{V_\pi} \quad \text{Formula 3}$$

$$B = \frac{\pi}{2} \cdot \frac{V_m}{V_\pi} \cdot \cos\omega_m t = b \cdot \cos\omega_m t$$

Figure 6:
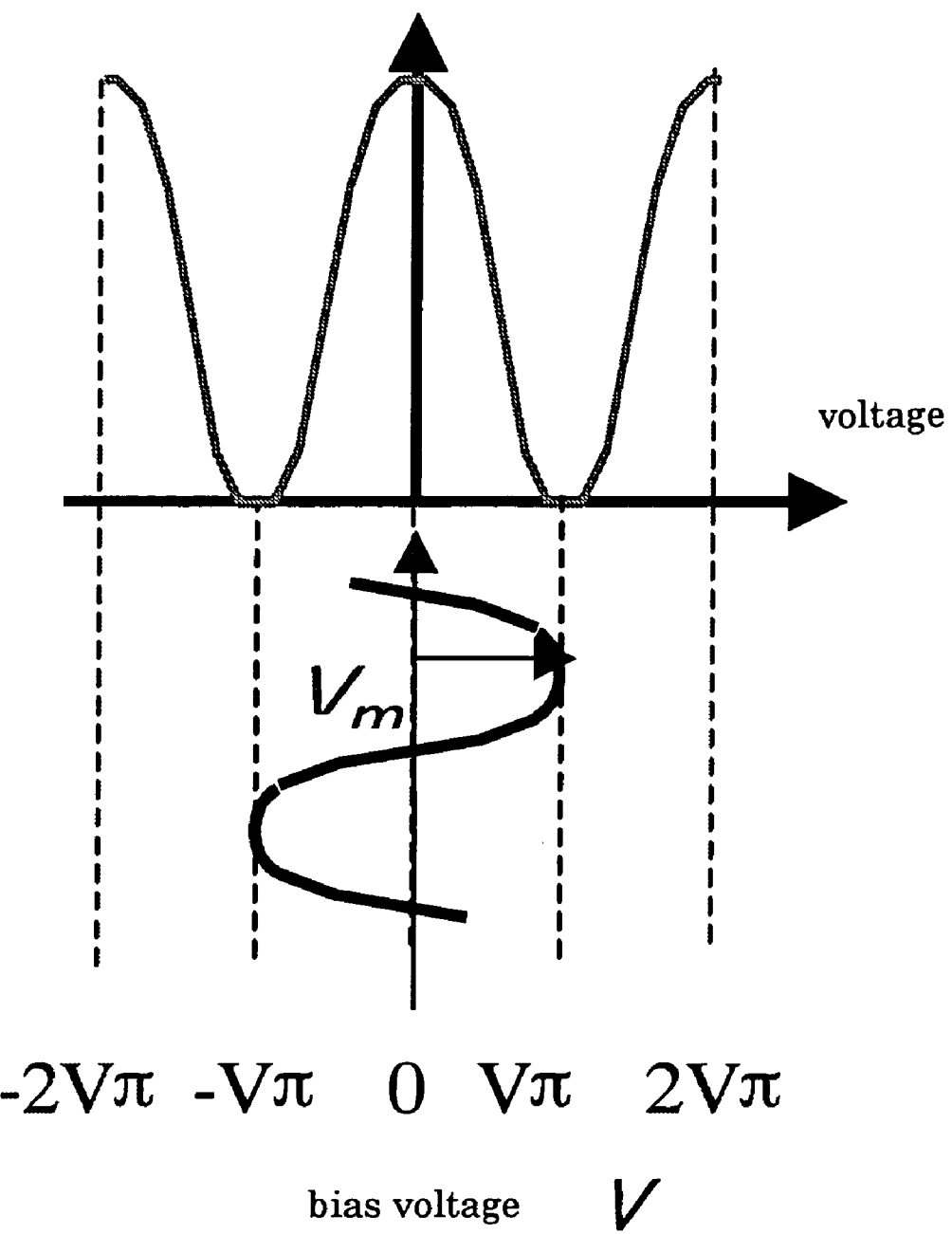
FIG. 6 is a diagram for explaining the relationship between a bias voltage applied on an optical modulator and optical output.

The optical intensities are summarized as table 1 and FIG. 6.

TABLE 1

| Vb | Oscillation of sideband wave | | of Oscillation of multiplied wave |
|---|---|---|---|
| | First item | Second item | |
| ON bias  0 | Even Order sidebands | Cancellation | Oscillation of (2 × 2k) harmonic wave |
| OFF bias  Vπ | Cancellation | Odd-order sidebands | Oscillation of (2 × (2k + 1)) harmonic wave |
| ON bias  2Vπ | Even Order sideband | Cancellation | Oscillation of (2 × 2k) harmonic wave |
| OFF bias  3Vπ | Cancellation | Odd-order sidebands | Oscillation of (2 × (2k + 1)) harmonic wave |
| ON bias  3Vπ | Even Order sidebands | Cancellation | Oscillation of (2 × 2k) harmonic wave |

"k" represents an integer.

As described above, even-order sideband waves are oscillated at the on-bias mode and odd-order sideband waves are oscillated at the off-bias mode. Multiplied waves are oscillated corresponding to the sideband waves, respectively.

Figure 5:
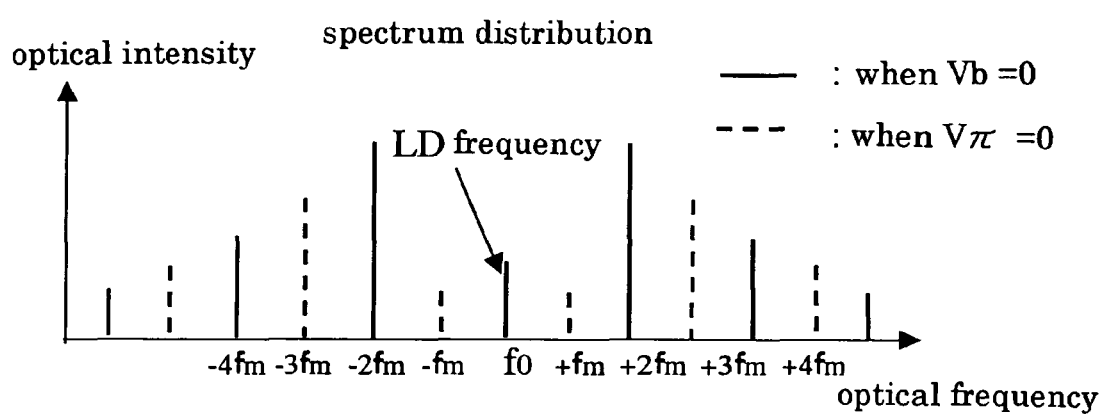
FIG. 5 is a diagram schematically showing spectrum distribution of n-order sideband wave.

FIG. 5 schematically shows spectrum distribution of each of the sideband waves in the light outputted from an optical modulator. Only sideband wave components of even-order ("n" represents even number) are generated, when the modulator is operated at a bias voltage at which the maximum peak position of optical output is provided (Vb: ON state). On the contrary, only sideband wave components of odd-order ("n" represents an odd number) are generated, when the modulator is operated at a bias voltage at which the optical output is zero (Vb: OFF state). Each of the high-order (n-order) sideband wave components deviates depending on the input voltage Vp-p and takes the maximum value at a specific driving voltage. It is thus possible to obtain a desired n-order component output as a beat signal, by selecting a specific driving voltage for increasing the desired high-order (n-order) component and for lowering the other unnecessary n-order components. The output is converted opto-electrically to generate electrical signal of radio frequency corresponding to 2×n×fm.

However, after the inventors have studied further, it is proved that different principle is applied with respect to electrical signal obtained by inputting light radiated from an optical modulator into an optical receiver and by converting the light opto-electrically by means of the receiver. That is, it is found that the input voltages Vp-p applied on an optical modulator for generating a desired electrical signal of multiplied wave and for lowering unnecessary wave components in the above case is different from that for providing the maximum optical intensity. These points will be described below.

That is, as described in PCT/JP2005/013201, preferred ranges of Vp-p/Vπ inputted into an optical modulator for each of the multiplied wave are as follows.

(Second Harmonic Wave)

The optical intensity of first-order sideband wave takes the maximum value at an input voltage of $(2.3V\pi)$Vp-p. The suppression ratio of third order sideband wave is more than 15 dB.

(Fourth Harmonic Wave)

The Optical Intensity of Second-Order Sideband Wave Takes the maximum value at an input voltage of $(3.95V\pi)$Vp-p. The suppression ratio of zero order sideband wave with respect to second order sideband wave is 30 dB or more and the suppression ratio of fourth order sideband wave with respect to second order sideband wave is 15 dB or more, at an input voltage of $(3.1V\pi)$Vp-p. The optical output is obtained as optical beat signal of both of the second order sideband waves (4×fm).

(Sixth Harmonic Wave)

The suppression ratio of fifth-order sideband wave with respect to first order sideband wave is 30 dB or more and that of first order sideband wave with respect to third order sideband wave is 11 dB, at an input voltage of $(4.8V\pi)$Vp-p. In this case, an optical filter may be used to cut the fifth order sideband wave on the output side of an intensity modulator, for further improving the suppression ratio of the fifth order sideband wave. The suppression ratio can be made 20 dB or more by means of the optical filter, to provide an output of the filter as optical beat signal of both of the sideband waves (6×fm).

The optical signal outputted form the optical receiver for OE conversion of the modulated light will be described below.

The electrical signal (photo current) I(photo) is represented as follows.

$$I_{photo} = I_o \cos^2\left(\frac{\pi V}{2V_\pi}\right) = I_o y^2 \quad \text{Formula 4}$$

$$V = V_b + V_m \cos\omega_m t$$

"Vb" represents a bias voltage, "Vm" represents an amplitude of driving voltage (Vp-p=2Vm), and "ωm" represents each frequency. Further, "y²" represents Bessel function and may be represented as follows. Further, "a" and "b" are represented as follows.

$$y_2 = \frac{1}{2}\underbrace{\cos\alpha}_{A} \cdot [J_0(b) + 2\sum_{n=1}^{\infty}(-1)^n J_{2n}(b)\cos(2n\omega_m t)] - \quad \text{Formula 5}$$

First Item $$\frac{1}{2}\underbrace{\sin\alpha}_{B} \cdot [2\sum_{n=1}^{\infty}(-1)^n J_{2n+1}(b)\cos\{(2n+1)\omega_m t\}] + \frac{1}{2}$$

First Item $$a = \pi V_b/V_\pi$$

$$b = \pi V_m/V_\pi \quad \text{Formula 6}$$

Figure 7:
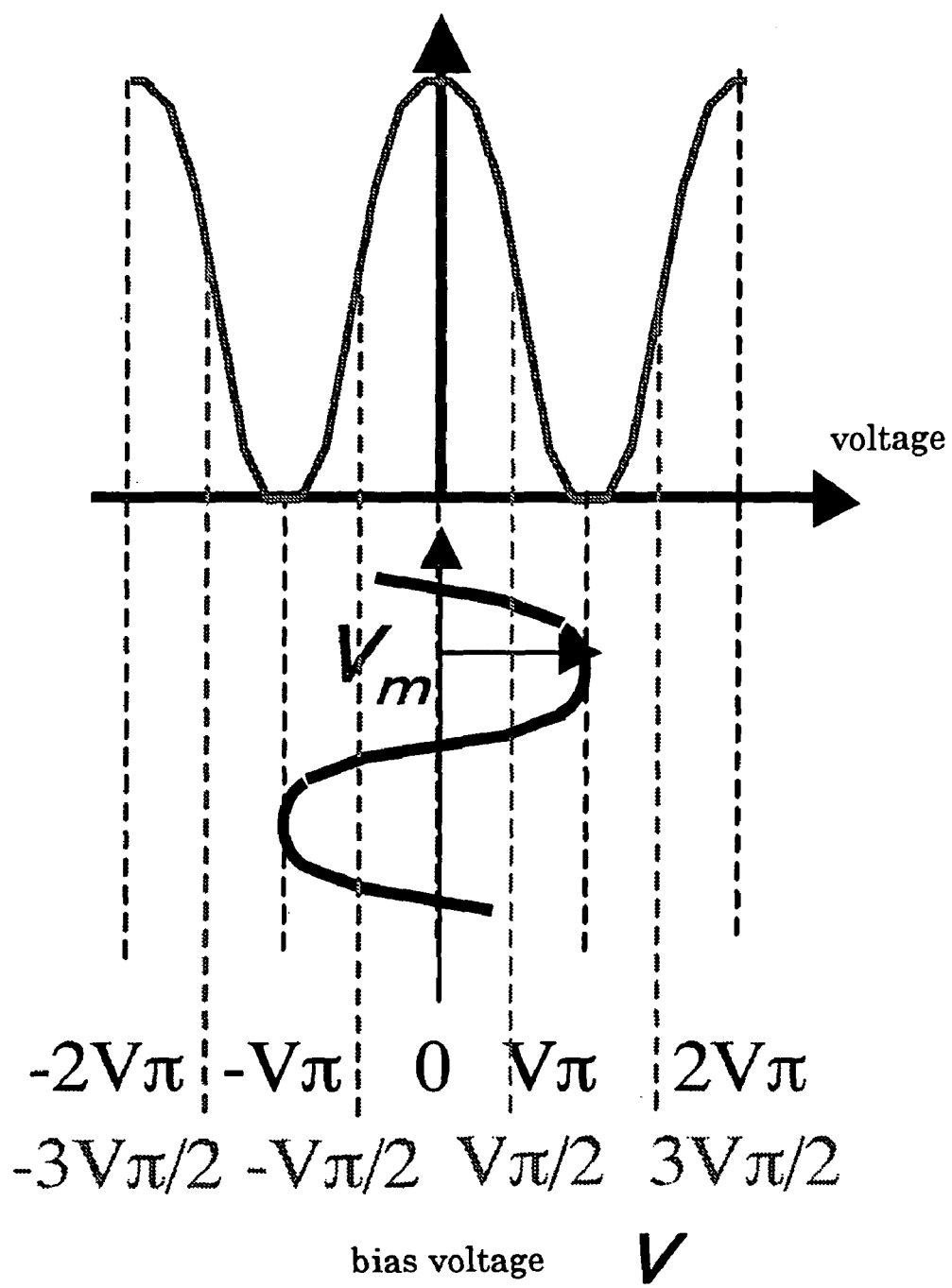
FIG. 7 is a diagram for explaining the relationship between a bias voltage applied on an optical modulator and power of photo current.

The results are summarized as shown in table 2 and FIG. 7.

TABLE 2

| | Vb | A | B | First item | Second item |
|---|---|---|---|---|---|
| ON bias | 0 | 1 | 0 | Even-order waves | Cancellation |
| | Vπ/2 | 0 | 1 | Cancellation | Odd-order waves |
| OFF bias | | -1 | 0 | Even-order waves | Cancellation |
| | Vπ | 0 | -1 | Cancellation | Odd-order waves |
| ON bias | 3Vπ/2 | 1 | 0 | Even-order waves | Cancellation |
| | 2Vπ | | | | |

As described above, only even-order waves of the inputted modulated frequency are generated, in the case where the bias voltage Vb is operated at the on-bias or off-bias mode (FIG. 6). Further, when the bias voltage Vb is Vπ/2 (intermediate point of optical intensity), only odd order waves of the inputted frequency are generated (FIG. 7). Particularly, when the bias voltage is operated at the on-bias or off-bias mode, only odd number wave can be generated. This is fundamentally different from PCT/JP2005/013201.

The power of microwave of photo current obtained by the opto-electric conversion in the optical receiver is studied for each of the multiplied waves, and the results are shown below.

Figure 8:
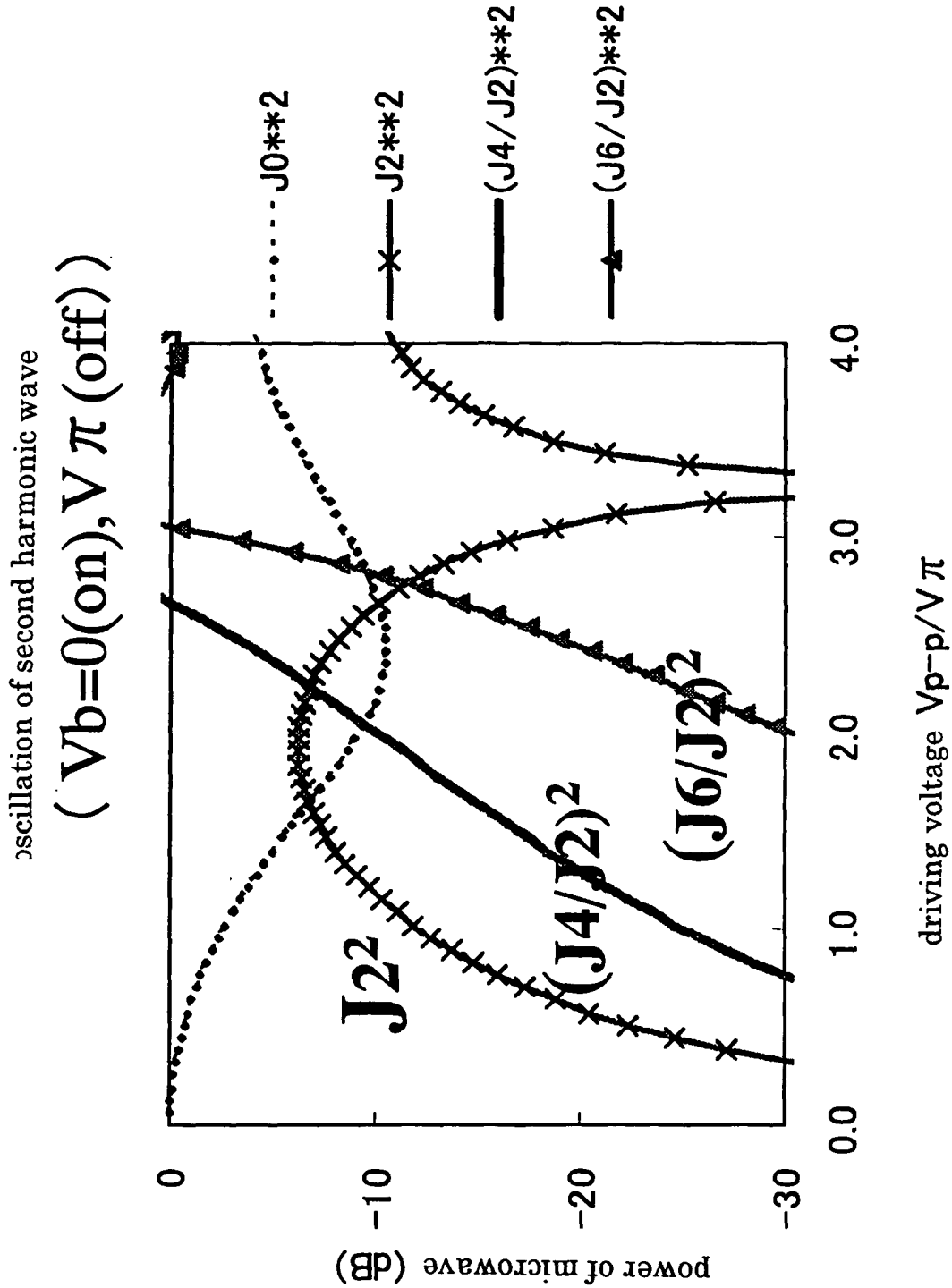
FIG. 8 is a graph showing the suppression ratio and power of microwave of multiplied wave in the case that second harmonic wave is oscillated.

FIG. 8 is a graph showing the relationship between the microwave power of second harmonic wave and inputted voltage/half-wavelength voltage (Vp-p/Vπ). The microwave power of the second harmonic wave takes the maximum when (Vp-p/Vπ) is 1.97. Particularly, when (Vp-p/Vπ) is 1.0 to 1.99, the suppression ratio of the fourth harmonic wave is minus 10 dB or lower and thus proved to be available. Further, on the viewpoint of improving the output power of the second harmonic wave, (Vp-p/Vπ) may preferably be 1.7 or higher and more preferably be 1.9 or higher. Further, (Vp-p/Vπ) may more preferably be 1.98 or lower.

Further, fourth harmonic wave has a microwave power nearer that of the second harmonic wave and the power ratio is lower than minus 10 dB. The bandwidth of the optical receiver is made higher than 2fm and lower than 4fm to cut the fourth harmonic wave (4fm) at the stage of the receiver, so that the second harmonic wave can be obtained at a high efficiency.

Figure 9:
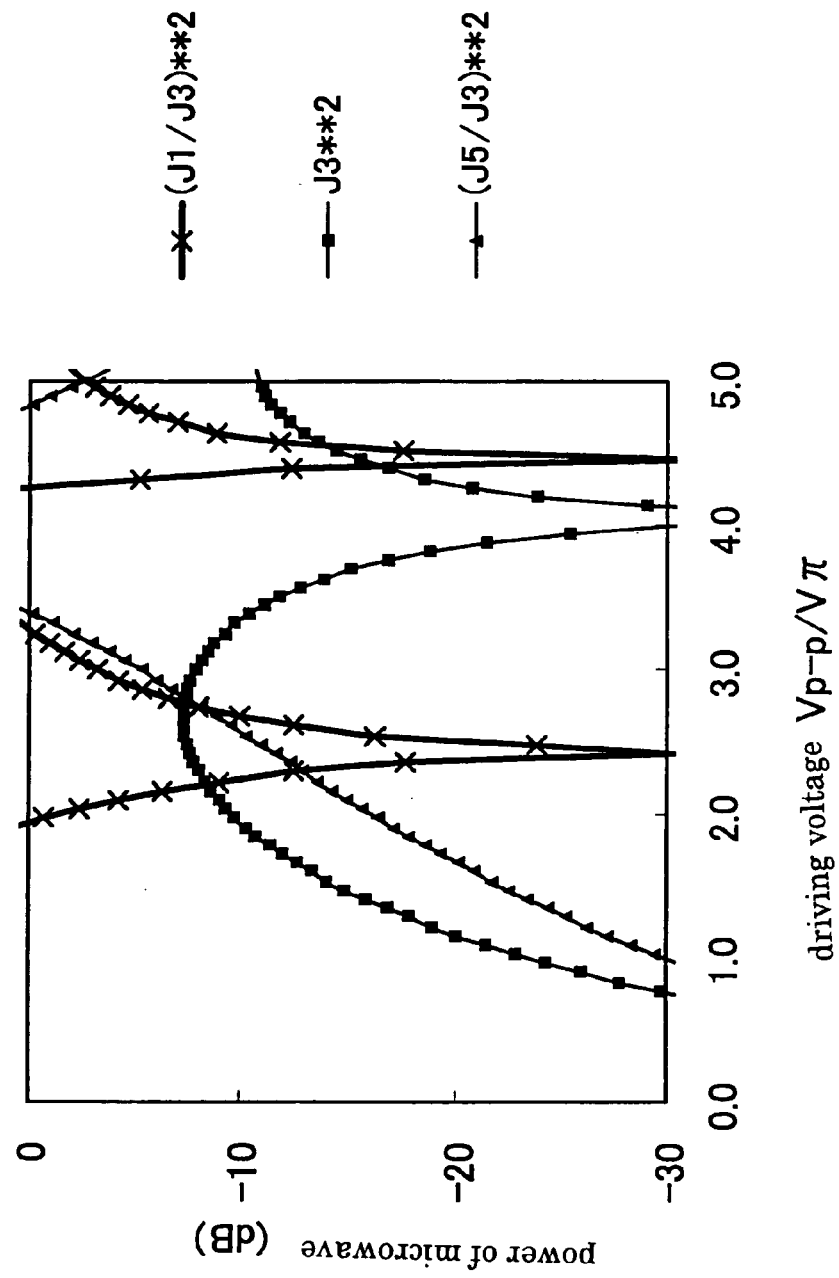
FIG. 9 is a graph showing the suppression ratio and power of microwave of multiplied wave in the case that third harmonic wave is oscillated.

FIG. 9 is a graph showing the relationship between the microwave power of third harmonic wave and inputted voltage/half-wavelength voltage (Vp-p/Vπ). The microwave power of the third harmonic wave takes the maximum when (Vp-p/Vπ) is 2.67. Further, when (Vp-p/Vπ) is 2.42, the power of the third harmonic wave takes a value near the maximum and the suppression ratio of the fm signal (low frequency component) is minus 30 dB or lower. Particularly when (Vp-p/Vπ) is 2.2 to 2.7, the power of the microwave is near the maximum and the power of the fifth harmonic wave is not so high. On the viewpoint, (Vp-p/Vπ) may preferably be 2.3 or higher and more preferably be 2.4 or higher. Further, (Vp-p/Vπ) may more preferably be 2.67 or lower and more preferably be 2.6 or lower.

Further, the bandwidth of the optical receiver is made higher than 3fm and lower than 5fm to cut the fifth harmonic wave (5fm) at the stage of the receiver, so that the third harmonic wave can be obtained at a high efficiency.

Figure 10:
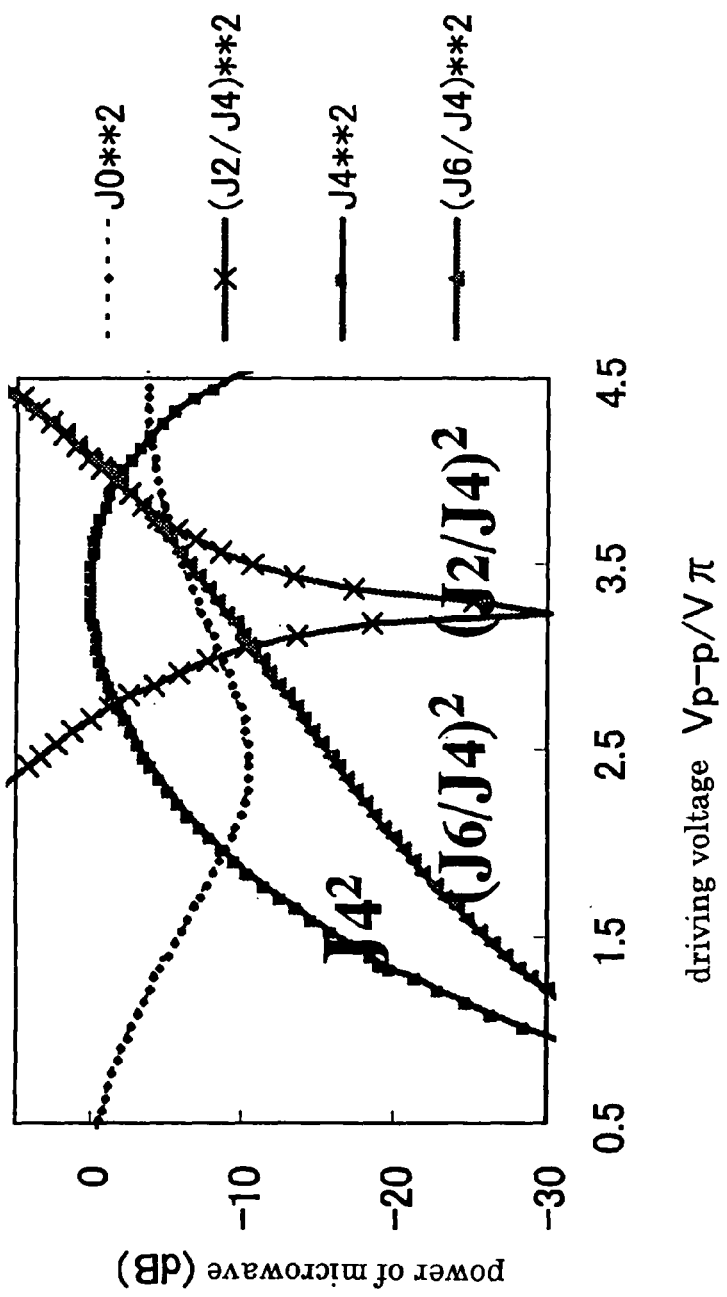
FIG. 10 is a graph showing the suppression ratio and power of microwave of multiplied wave in the case that fourth harmonic wave is oscillated.

FIG. 10 is a graph showing the relationship between the microwave power of fourth harmonic wave and inputted voltage/half-wavelength voltage (Vp-p/Vπ). The microwave power of the second harmonic wave takes the maximum when (Vp-p/Vπ) is 3.27. Further, when (Vp-p/Vπ) is 3.25, the microwave power of the fourth harmonic wave takes a value near the maximum and the suppression ratio of the 2fm signal (low frequency component) is minus 30 dB or lower. Particularly when (Vp-p/Vπ) is 2.9 to 3.6, the power of the microwave is near the maximum and the powers of unnecessary waves are not so high. On the viewpoint, (Vp-p/Vπ) may preferably be 3 or higher and more preferably be 3.1 or higher. Further, (Vp-p/Vπ) may more preferably be 3.5 or lower and more preferably be 3.4 or lower.

Further, the bandwidth of the optical receiver is made higher than 4fm and lower than 6fm to cut the fourth harmonic wave (4fm) at the stage of the receiver, so that the fourth harmonic wave can be obtained at a high efficiency.

Figure 11:
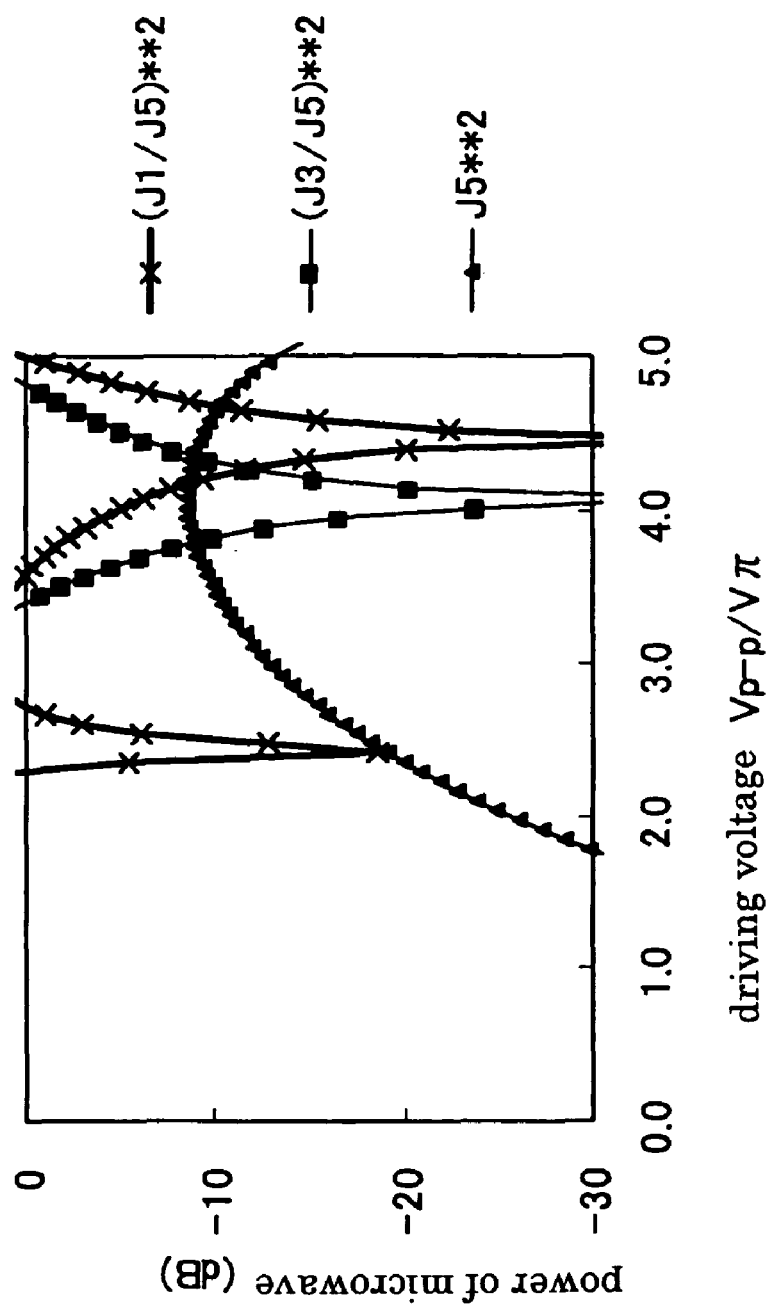
FIG. 11 is a graph showing the suppression ratio and power of microwave of multiplied wave in the case that fifth harmonic wave is oscillated.

FIG. 11 is a graph showing the relationship between the microwave power of fifth harmonic wave and inputted voltage/half-wavelength voltage (Vp-p/Vπ). The microwave power of the fifth harmonic wave takes the maximum when (Vp-p/Vπ) is 4.07. Further, when (Vp-p/Vπ) is 4.01, the microwave power of the fifth harmonic wave takes a value near the maximum and the suppression ratio of the third harmonic wave is minus 30 dB or lower. Particularly when (Vp-p/Vπ) is 3.7 to 4.7, the power of the microwave is near the maximum and the powers of unnecessary waves are not so high. On the viewpoint, (Vp-p/Vπ) may preferably be 3.8 or higher. Further, (Vp-p/Vπ) may more preferably be 4.6 or lower and more preferably be 4.5 or lower.

Further, the bandwidth of the optical receiver is made higher than 5fm and lower than 7fm to cut the fifth harmonic wave (5fm) at the stage of the receiver, so that the fifth harmonic wave can be obtained at a high efficiency.

Figure 12:
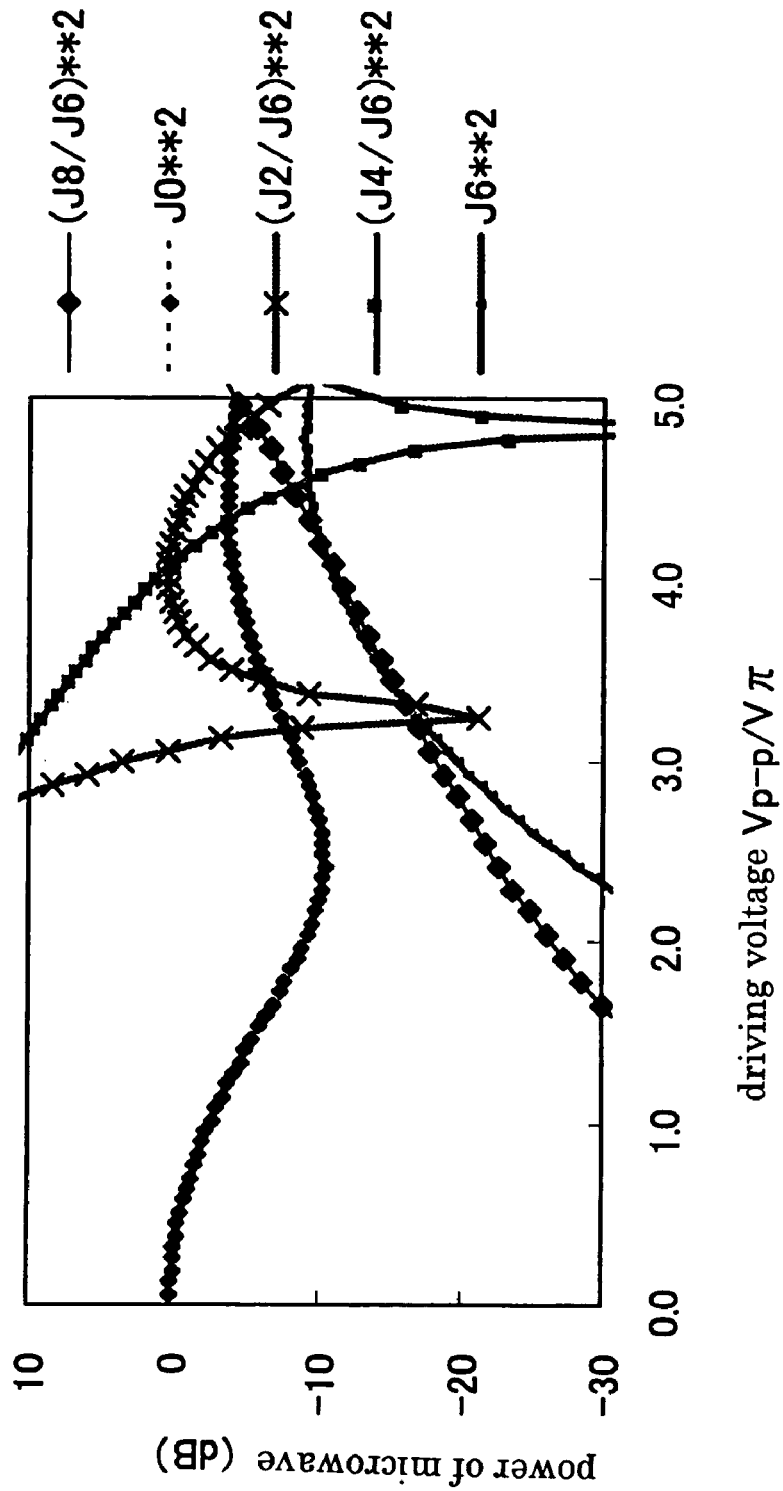
FIG. 12 is a graph showing the suppression ratio and power of microwave of multiplied wave in the case that sixth harmonic wave is oscillated.

FIG. 12 is a graph showing the relationship between the microwave power of sixth harmonic wave and inputted voltage/half-wavelength voltage (Vp-p/Vπ). The microwave power of the sixth harmonic wave takes the maximum when (Vp-p/Vπ) is 4.77. Further, when (Vp-p/Vπ) is 4.8, the power of the sixth harmonic wave takes a value near the maximum and the suppression ratio of low frequency component is minus 30 dB or lower. Particularly when (Vp-p/Vπ) is 4.5 to 5.2, the power of the microwave is near the maximum and the powers of unnecessary waves are not so high. On the viewpoint, (Vp-p/Vπ) may preferably be 4.6 or higher and more preferably be 4.7 or higher. Further, (Vp-p/Vπ) may more preferably be 5.1 or lower and more preferably be 5 or lower.

Further, the bandwidth of the receiver is made higher than 6fm and lower than 8 μm to cut the sixth harmonic wave (6fm) at the stage of the receiver, so that the sixth harmonic wave can be obtained at a high efficiency.

The radio oscillating system according to the present invention may have one or a plurality of radiating means for radiating radio signal. In the latter case, beam radiated from the optical modulator for oscillation is divided into plural routes so that beam passing through each route is inputted into the corresponding optical receiver. The attenuation of light due to the division and transmission is small, so that it is possible to reduce the cost in the case of providing a plurality of radio signal radiating means.

Figure 13:
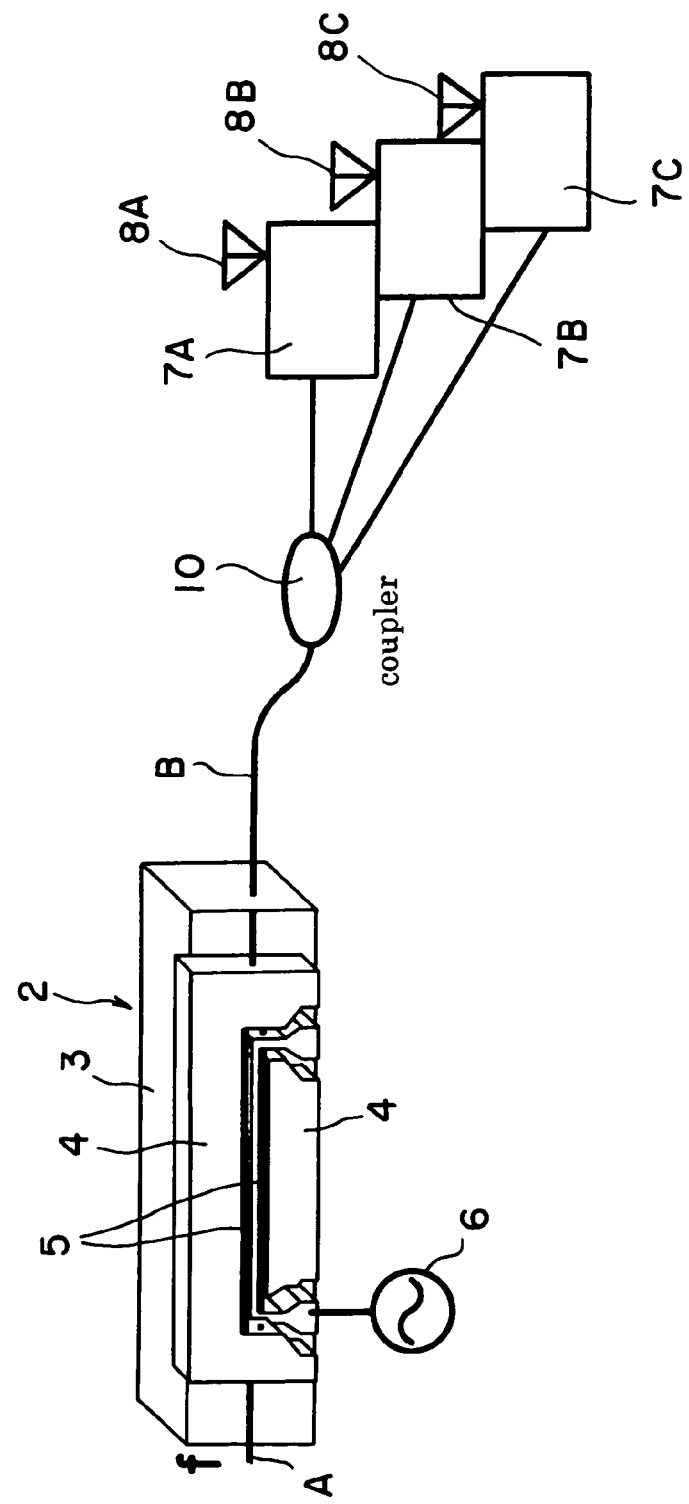
FIG. 13 is a diagram schematically showing an embodiment that outgoing beam "B" is divided into plural radio oscillating means.

For example, as shown in FIG. 13, beam "B" radiated from the optical modulator 2 is divided into plural routes by means of an optical coupler 10. The beam passing in each of the routes is intercepted by an receiver 7A, 7B or 7C to oscillate electrical signal of a target frequency, so that the radiating means 8A, 8B and 8C radiates radio signal of the target frequency, respectively.

According to the present invention, the receiver is provided for receiving the radio signal reflected by an object, and the radio signal and received signal are processed to obtain information about the object. Specific construction and applications of the radar system are not limited. It is further possible to provide a plurality of the radio signal radiating means and radio signal receiving means.

Figure 14:
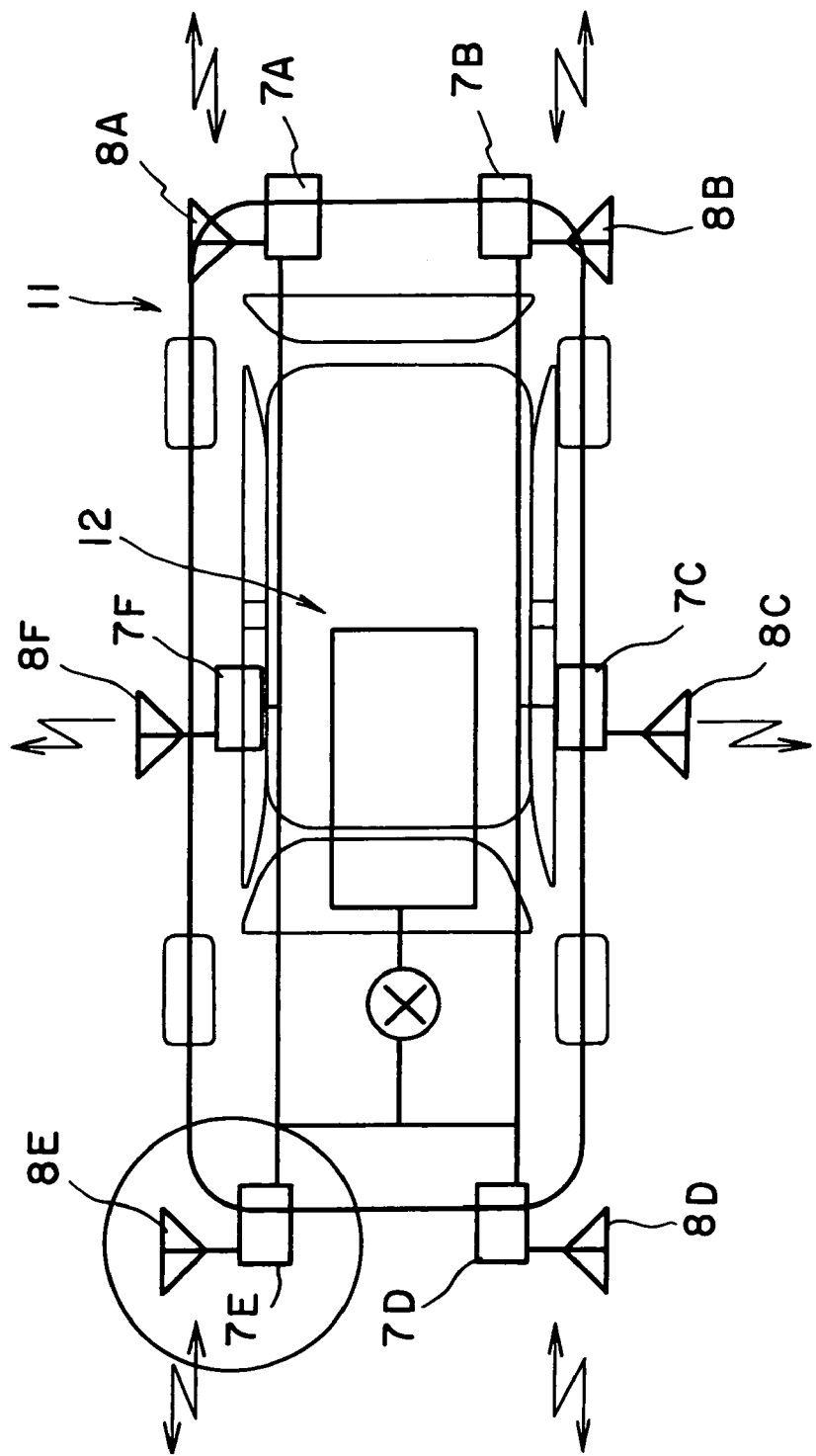
FIG. 14 is a diagram schematically showing an automobile equipped with plural radio oscillating systems.

For example, according to an example shown in FIG. 14, a system 12 for oscillating millimeter-wave is ground at a specific position of an automobile 11. Optical receivers 7A, 7B, 7C, 7D, 7E and 7F and radiating means 8A, 8B, 8C, 8D, 8E and 8F corresponding the respective receivers are equipped at predetermined positions of the automobile 11.

The inventive radar system will be described further in detail.

According to a preferred embodiment, it is provided an electrical dividing means for dividing the electrical signal outputted from the optical receiver and a mixer for mixing the divided signal from the electrical dividing means and the received signal.

Figure 15:
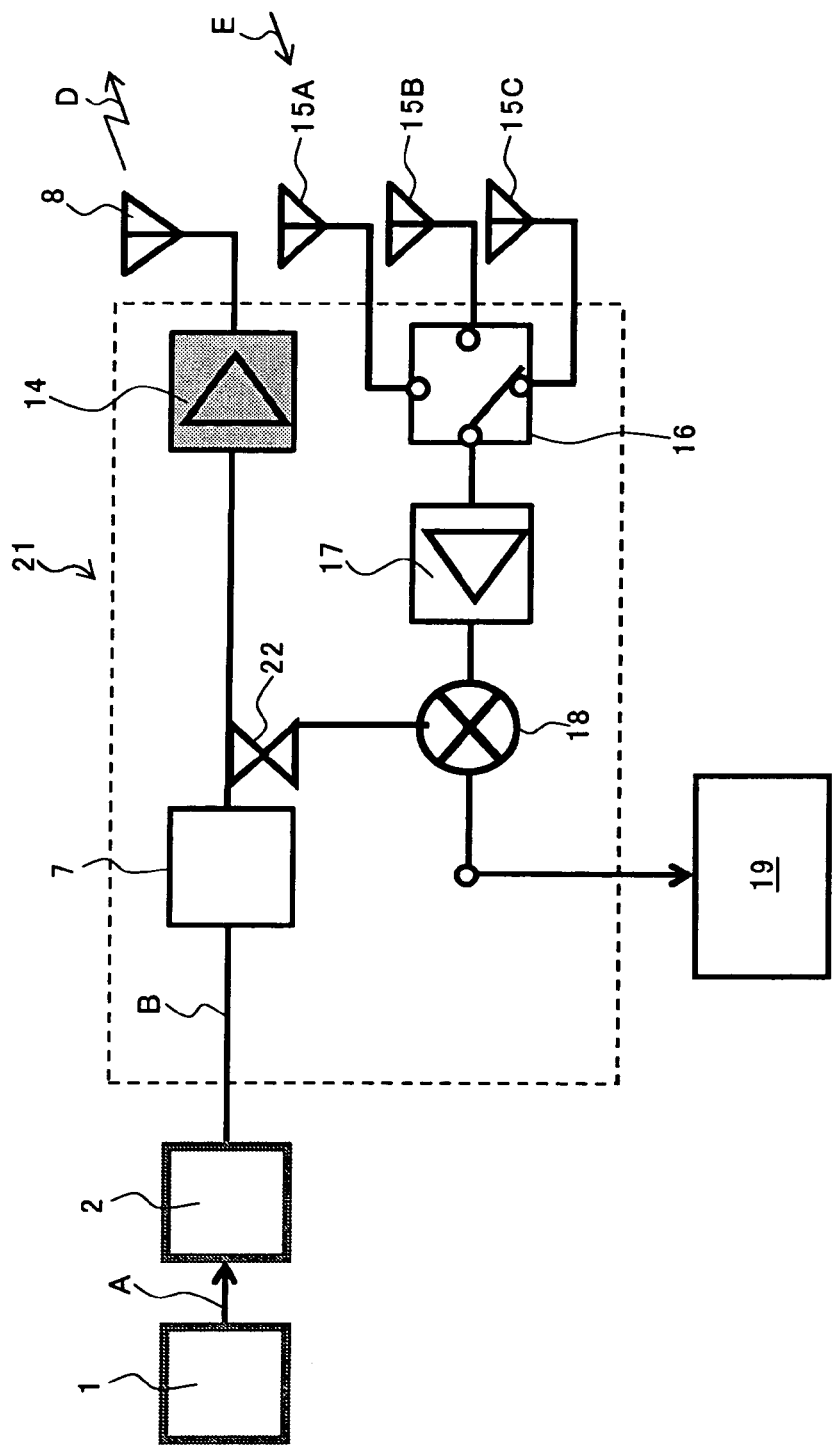
FIG. 15 is a block diagram schematically showing a radar system according to one embodiment of the present invention.

FIG. 15 is a block diagram showing a radar unit 21 according to this embodiment. Carrier wave "A" is irradiated from a light source 1 into the optical modulator 2, and the outgoing beam "B" described above is inputted into the optical receiver 7 for oscillation. The electrical signal of the target frequency oscillated from the optical receiver 7 is divided into two routes by means of an electrical dividing means 22 (for example, power divider). One of the divided electrical signals is amplified by an electrical amplifier 14 and radiated as an arrow "D" with a radiating means 8.

The other of the divided electrical signals (having the target frequency) is transmitted to a mixer 18. On the other hand, light "E" reflected from an object is received by each of the light intercepting means 15A, 15B and 15C. The signal from each means for receiving lightwave is selected by a switch 16 and amplified by an amplifier 17, and then mixed with the divided electrical signal by an mixer 18. The output is then processed in a predetermined signal processor 19 to obtain information about the position, velocity or the like of the object. Further, a filter may be positioned between the optical receiver 7 and the electrical dividing means 22 to cut signal of undesired frequencies.

Figure 16:
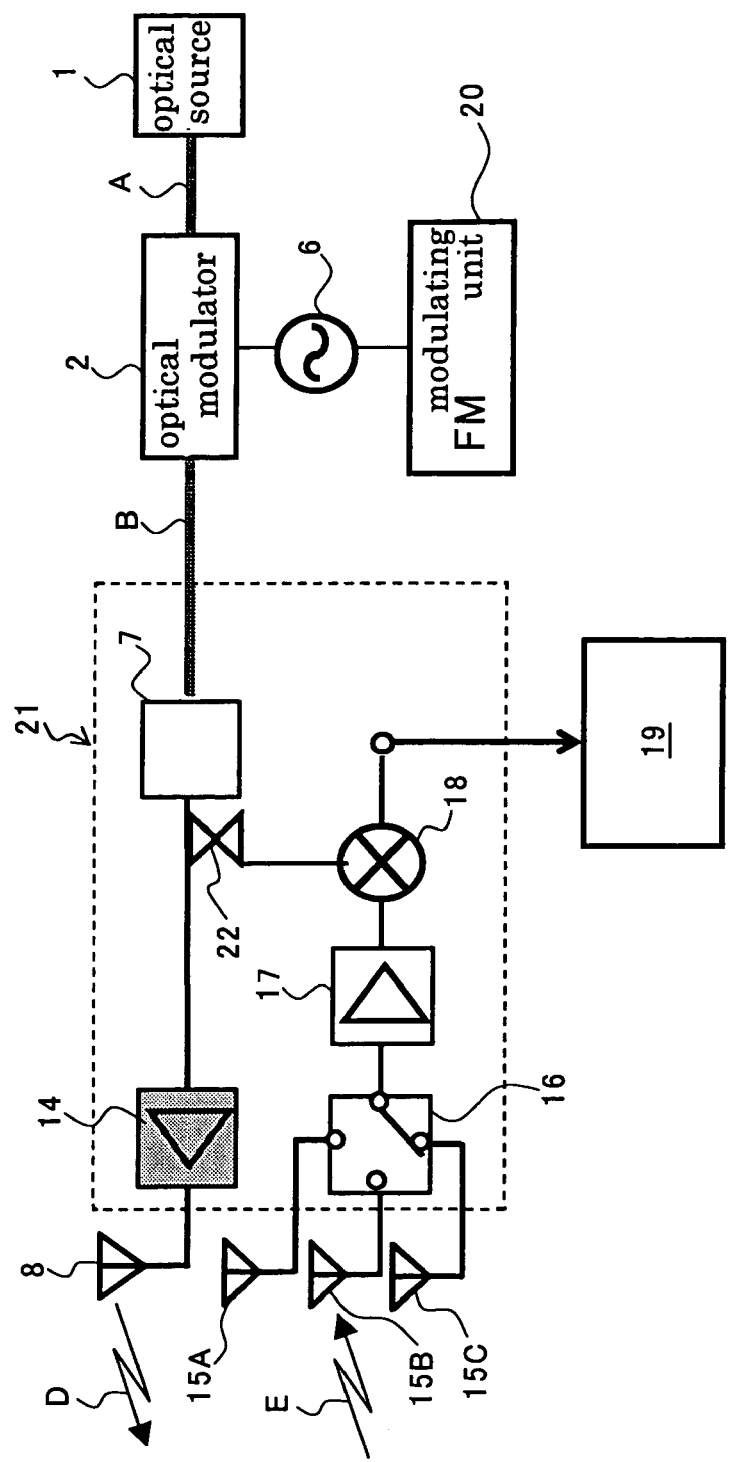
FIG. 16 is a block diagram schematically showing a radar system according to another embodiment of the present invention.

According to an example of FIG. 16, the radar system shown in FIG. 15 is used. Modulating signal of a frequency of fm is applied onto the optical modulator 2 by an electric source 6. Further, according to the present example, signal from the source 6 is modulated with an FM modulating unit 20.

According to another embodiment, it is provided an optical dividing means for dividing light radiated from the optical modulator to perform the oscillation of radio signal and reception of the received signal based on the radiated light propagating through plural routes after the division.

Figure 17:
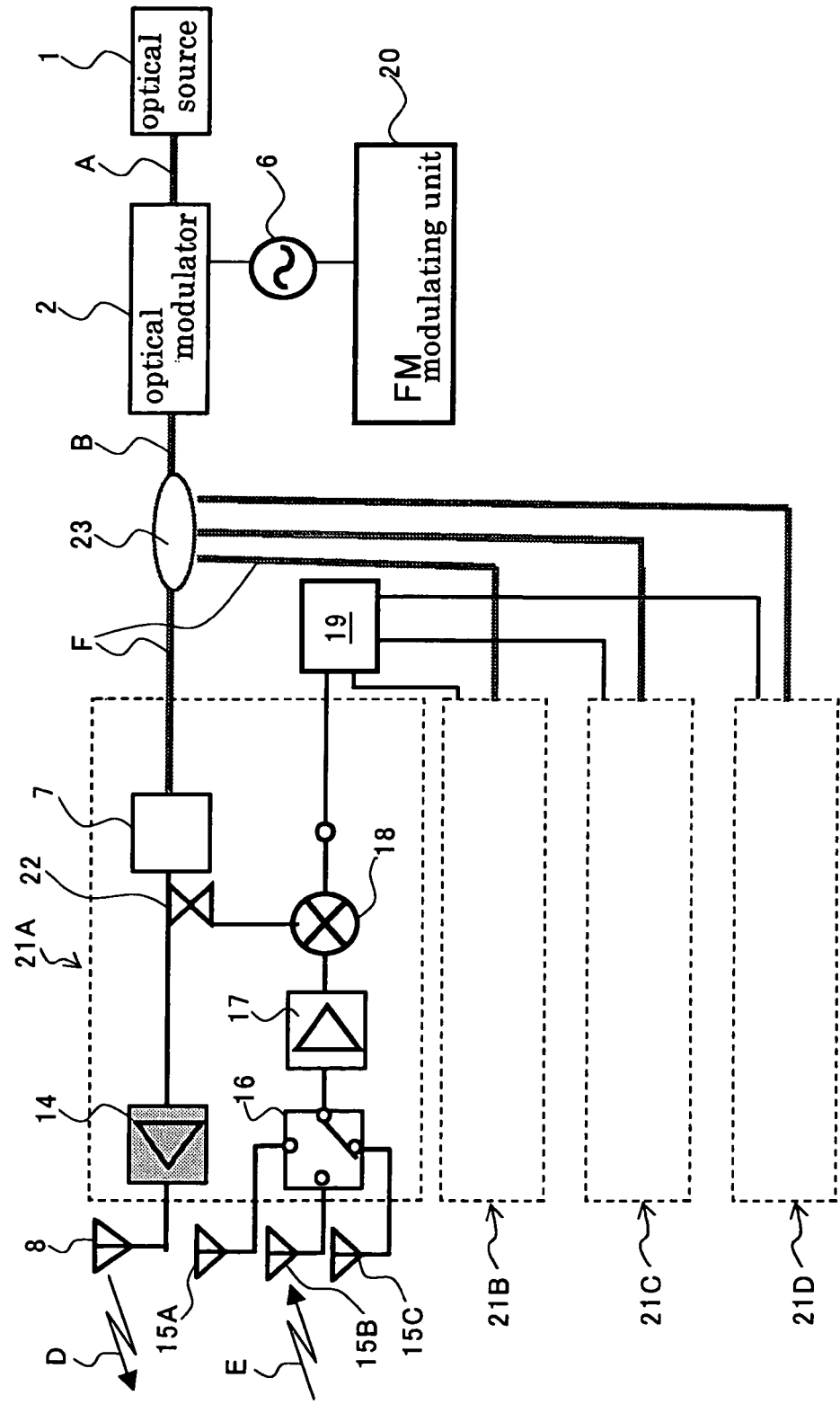
FIG. 17 is a block diagram schematically showing a radar system according to still another embodiment of the present invention, where the system has a plurality of radar units 21A, 21B, 21C and 21D.

FIG. 17 is a block diagram according to this embodiment.

The construction of each of the radar units 21A, 21B, 21C and 21D is substantially same as that of the radar unit 21 of FIG. 16 described above, and the explanation is omitted. According to the present example, light "B" radiated from the optical modulator 2 is divided into plural routes as arrows "F" with an optical dividing means 23 (such as optical coupler). The radar systems 21A, 21B, 21C and 21D are provided corresponding to the thus divided signals, respectively. Each of the radar systems performs the oscillation and reception of the radio signal, which is then processed with a signal processor 19 to obtain information about the object.

Further, according to a preferred embodiment, the radar system has an optical dividing means for dividing light radiated from the optical modulator, an additional optical modulator for receiving the thus divided light radiated from the former modulator and for further modulating the radiated light based on the received signal, and an additional optical receiver for receiving the light radiated from the additional modulator to convert it to electrical signal.

Figure 18:
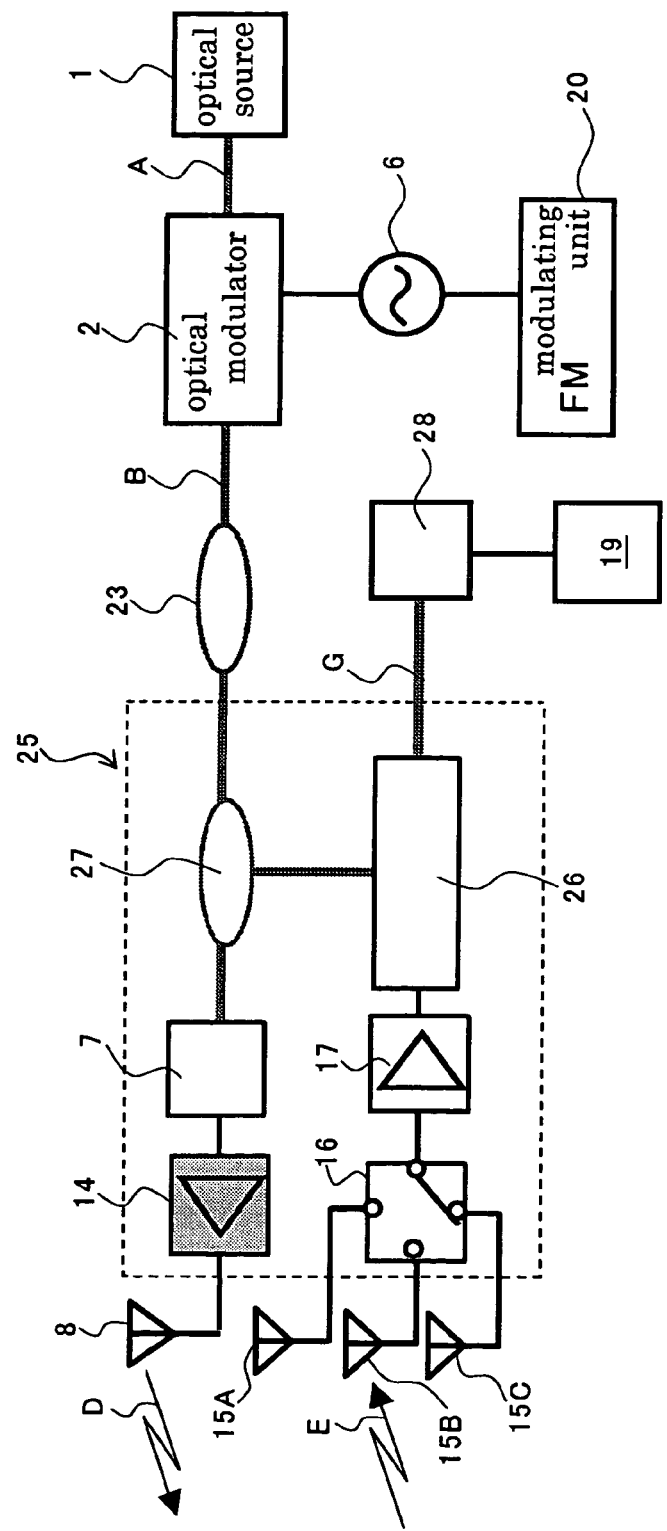
FIG. 18 is a block diagram schematically showing a radar system according to still another embodiment of the present invention.

FIG. 18 is a block diagram according to this embodiment.

Carrier wave "A" is radiated into the optical modulator 2 from the light source 1, and the above described radiated beam "B" is made incident into the optical dividing means (for example, optical coupler) 23 and 27. One of the divided beams radiated from the optical dividing means 27 is made incident into the optical receiver 7. The optical receiver 7 radiates electrical signal of a target frequency, which is then amplified with an electrical amplifier 14, so that the oscillating means 8 oscillates radio signal as an arrow "D".

On the other hand, the other of the divided light (target frequency) is made incident into an optical modulator 26. Further, light "E" reflected from an object is received by each of receiving means 15A, 15B and 15C. Each signal from each receiving means is selected by a switch 16, amplified by an amplifier 17 and then used as a signal for controlling and modulating the optical modulator 26. The optical modulator 26 radiates light "G", which is intercepted by an additional optical receiver 28 to convert it to electrical signal. The electrical signal from the optical receiver 28 is processed by a signal processing unit 19 to obtain information about the object.

According to a preferred embodiment, it is provided an optical dividing means for dividing light radiated from the optical modulator into plural routes, so as to perform the oscillation of radio signal and reception of the received signal based on the light propagating through the plural routes, respectively.

Figure 19:
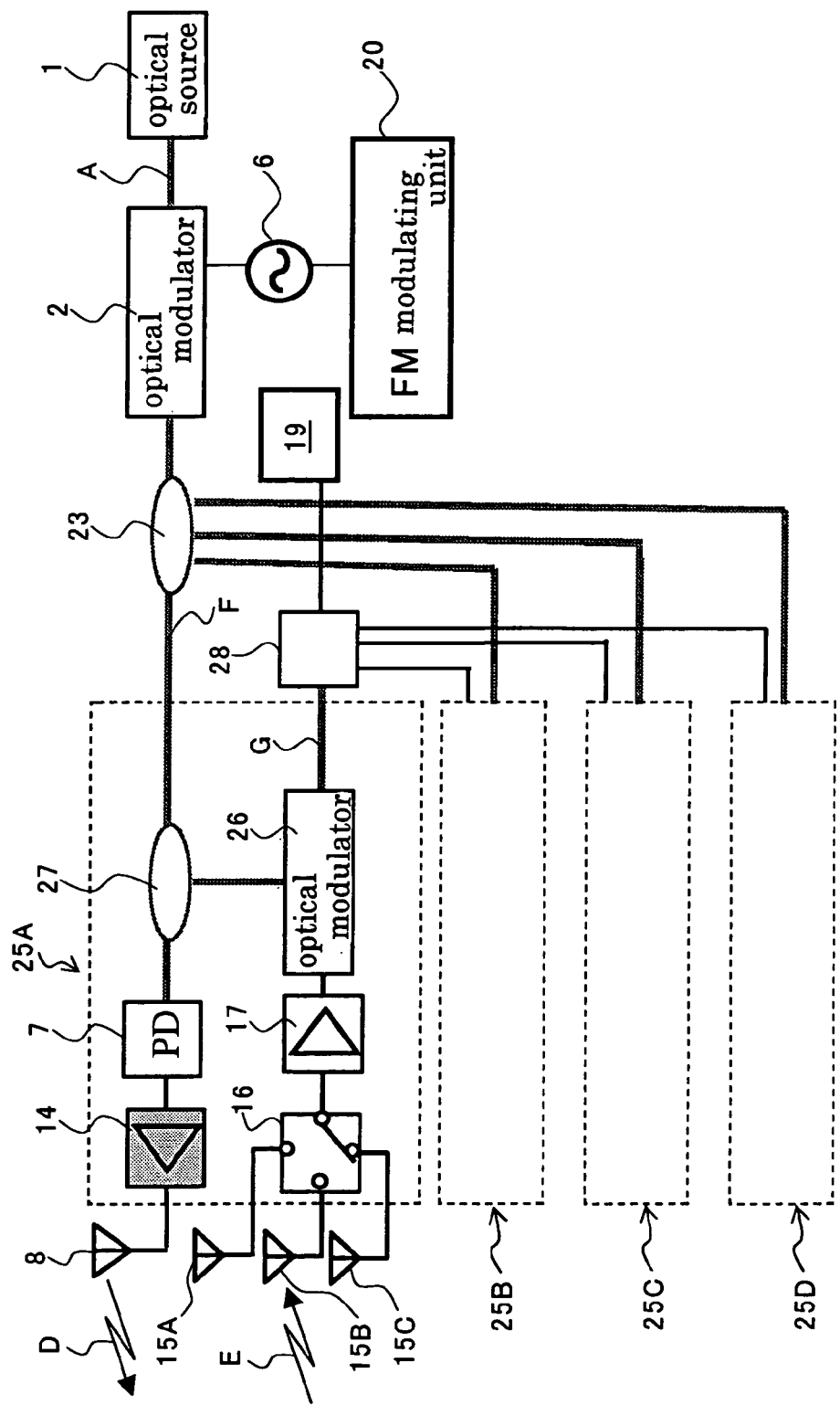
FIG. 19 is a block diagram schematically showing a radar system according to still another embodiment of the present invention, where the system has a plurality of radar units 25A, 25B, 25C and 25D.

FIG. 19 is a block diagram according to this embodiment.

The construction of each of the radar units 25A, 25B, 25C and 25D is substantially same as that of the radar unit 25 of FIG. 18 described above, and the explanation is omitted. According to the present example, beam "B" radiated from the optical modulator 2 is divided into plural routes as arrows "F" with an optical dividing means 23 (such as optical coupler). The radar systems 25A, 25B, 25C and 25D are provided corresponding to the thus divided signals, respectively. Each of the radar systems performs the oscillation and interception of the radio signal, which is then converted to electrical signal by the optical receiver 28 and processed with a signal processor 19 to obtain information about the object.

According to a preferred embodiment, the modulator for oscillation is an intensity modulator or phase modulator. More preferably, the optical modulator for oscillation has a substrate made of an electro-optic material, an optical waveguide provided on the substrate and traveling-wave type electrodes for applying a modulating voltage on the optical waveguide.

Such optical modulator includes an LN(lithium niobate)-MZ(Mach-Zehnder) type optical modulator, an electro-absorption type (EA) optical modulator, a semiconductor MZ type optical modulator, and an SSB type optical modulator. An LN-MZ type optical modulator is characterized in a low optical insertion loss compared with an EA optical modulator or semiconductor MZ type optical modulator. It may be thus possible to alleviate the necessity of an optical amplifier or an electrical amplifier in the case that light is divided into plural routes.

The inventors have developed optical modulators comprising a thin plate of X-cut lithium niobate single crystal and having a wide bandwidth and low driving voltage for use in optical communication. In the case that the optical modulator is used for radio oscillation, the application bandwidth is limited within several GHz, so that it is sufficient to satisfy desired optical modulating property only within such narrow bandwidth. In the application of radio oscillation, the application bandwidth is narrow. It is thus easy to adjust the output impedance of an oscillator required for driving and modulation to the input impedance of electrodes of an optical modulator in the narrow application bandwidth. $V\pi$ can be further lowered and the multiplication factor can be further improved.

On the viewpoint, the gap width of electrodes in the traveling wave type electrodes may preferably be 20 μm or smaller.

The specific construction of the optical modulator is not particularly limited and includes those described in Japanese patent publications H10-082921A, 2001-06651A, 2002-109133A, 2001-101729A, 9-211402A and 2001-235714A.

Figure 20:
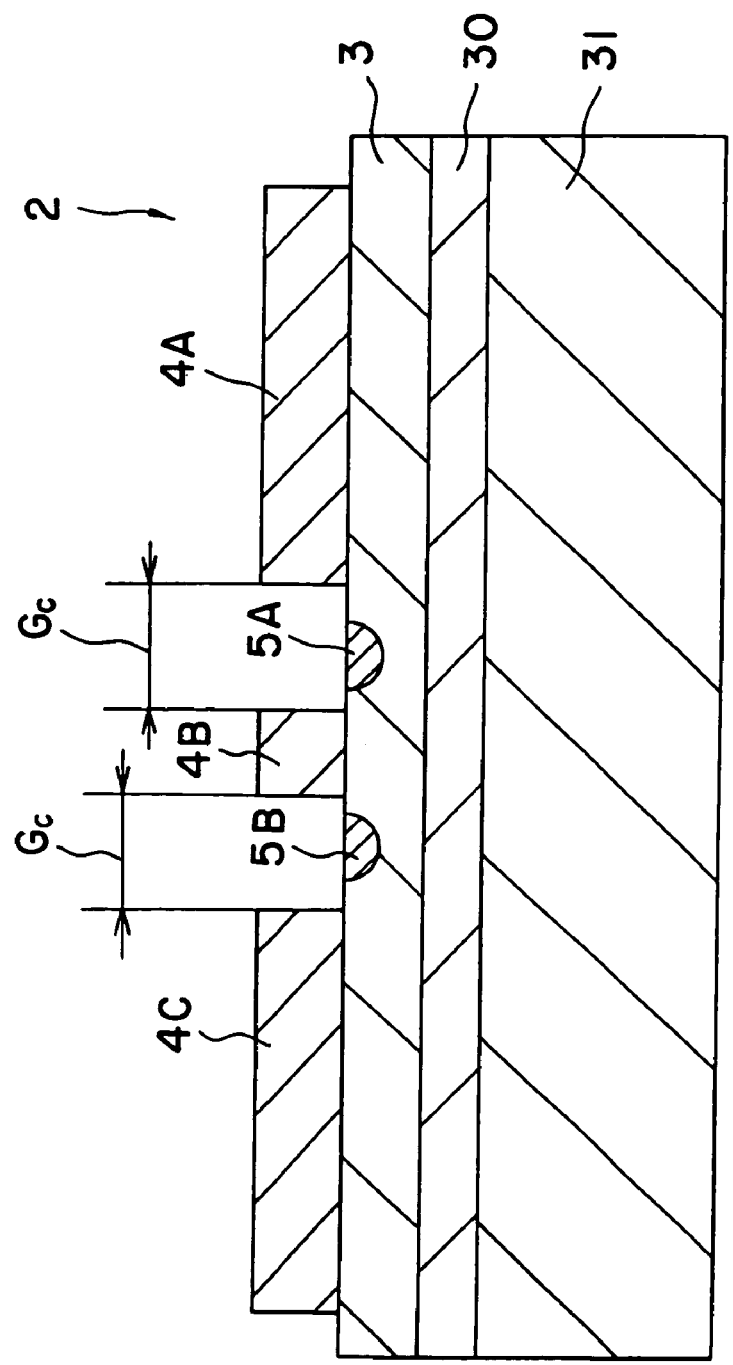
FIG. 20 is a schematic view showing an example of an optical modulator 2.

FIG. 20 is a cross sectional view showing an example of an optical modulator.

An optical modulator 2 has an optical waveguide substrate 3 and a supporting body 31. The substrate 3 and supporting body 31 are both plate shaped. The thickness of the substrate 3 is preferably 100 μm or smaller and more preferably be 30

μm or smaller. Predetermined electrodes 4A, 4B and 4C are formed on one main face of the substrate 3. Although so-called coplanar waveguide type (CPW) electrode configuration is applied according to the present example, the configuration of electrodes is not particularly limited. For example, so-called asymmetric coplanar strip line (A-CPS) type electrode configuration can be used. Traveling wave type modulator of so-called independent-modulation type can be further applied.

According to the present example, a pair of optical waveguides 5A and 5B are formed between the adjacent electrodes, so that a signal voltage can be applied onto each of the waveguides 5A and 5B in a direction substantially parallel with the main face. The optical waveguide is of Mach-Zehnder type structure in a plan view. Such Mach-Zehnder type pattern itself is well known. An adhesive layer 30 having a substantially constant thickness is provided between the lower face of the substrate 3 and the supporting body 31 to adhere the substrate 3 and supporting body 31.

The optical waveguide may be a ridge type optical waveguide directly formed on the one main face of the substrate, or a ridge type optical waveguide formed on another layer on the one main face of the substrate. Alternatively, the optical waveguide may be an optical waveguide formed by inner diffusion process such as titanium diffusion process, or an optical waveguide produced by ion exchange process such as proton exchange. Specifically, the optical waveguide may be a ridge type optical waveguide protruding from the surface of the substrate. The ridge type optical waveguide may be formed by laser or mechanical processing. Alternatively, a high refractive index film is formed on the substrate and processed with a machine or laser ablation to form a ridge type three-dimensional optical waveguide. The high refractive index film may be formed by, for example, chemical vapor deposition, physical vapor deposition, organic metal chemical vapor deposition, sputtering or liquid phase epitaxial method.

The electrode may be formed on the surface of the substrate, or may be formed on a buffer layer or a low dielectric layer formed on the surface of the substrate. The low dielectric layer may be made of any known materials such as silicon dioxide, magnesium fluoride, silicon nitride and alumina. The low dielectric layer means a layer made of a material having a dielectric constant lower than that forming the substrate.

The thickness of the adhesive layer 30 may preferably be 1000 μm or smaller and more preferably be 300 μm or smaller and most preferably be 100 μm or smaller. Further, although the lower limit of the thickness of the adhesive layer 30 is not particularly defined, the thickness may preferably be 10 μm or smaller, on the viewpoint of lowering the effective refractive index of microwave.

The optical waveguide substrate 3 and supporting body 31 are made of an electrooptic material having ferroelectricity and may preferably be made of a single crystal. Such crystal is not particularly limited as far as it is effective for light modulation, and includes lithium niobate, lithium tantalate, lithium niobate-lithium tantalate solid solution, potassium lithium niobate, KTP, GaAs and quartz.

The material of the supporting body 31 includes a glass such as quartz glass, in addition to the above described materials.

Although the adhesive is not particularly limited as fas as the adhesive satisfies the above conditions, the adhesive includes an epoxy adhesive, a thermal setting type adhesive, an ultraviolet curable adhesive, and a ceramic adhesive having a thermal expansion coefficient near that of the electrooptic material such as lithium niobate, for example "ALON CERAMICS C" (manufactured by Toa Gosei Co., Ltd.: a thermal expansion coefficient of $13 \times 10^{-6}$/K).

A sheet made of an adhesive is interposed between the back face of the substrate and the supporting body to join them. Preferably, a sheet made of an adhesive of a thermosetting resin, photoresist resin or light thickening resin is interposed between the back face of the main body and the supporting body and then cured.

EXAMPLES

The radar system was produced using an optical modulator 2 shown in FIG. 20.

Specifically, Ti-diffusion waveguides 5A, 5B and CPW electrodes 4A, 4B and 4C were formed on a substrate of x-cut lithium niobate. As to the electrode structure, the gaps "G" between the central electrode 4B and ground electrodes 4A 4C were 20 μm, the electrode thickness was 20 μm, and the electrode length was 40 mm. The modulator substrate was adhered to a dummy plate fixed onto a surface plate with a thermoplastic resin, so that the electrode face is oriented downwardly. The substrate was then subjected to horizontal polishing and polishing to a thickness of 6 μm. A plate-shaped reinforcing body 31 of x-cut lithium niobate was adhered to the modulator substrate. The body was subjected to optical polishing at the end face of the optical waveguide and cut into chips. An adhesive having a specific dielectric constant of 4 was used as the adhesive for the fixation and the thickness of the adhesive layer 30 was 50 μm. The modulator chip was adhered and fixed to an optical fiber with an UV curable resin after the adjustment of light axis. After the chip was mounted, the properties were evaluated to prove that Vπ was 1.5 V. Further, the 3 dB bandwidth was 20 GHz based on the optical response.

Figure 1:
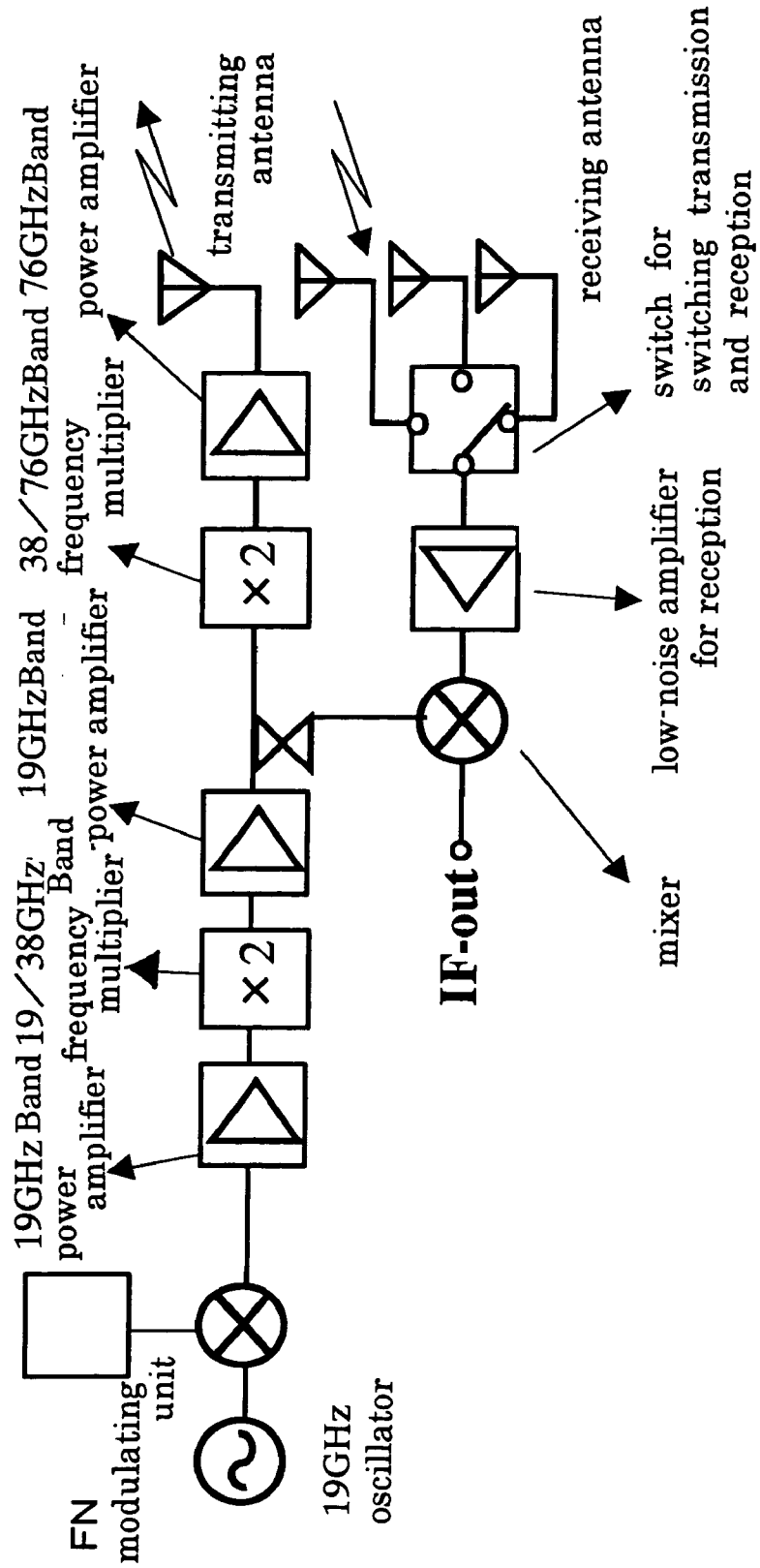
FIG. 1 is a block diagram showing an example of a radar system according to a prior art.
Figure 2:
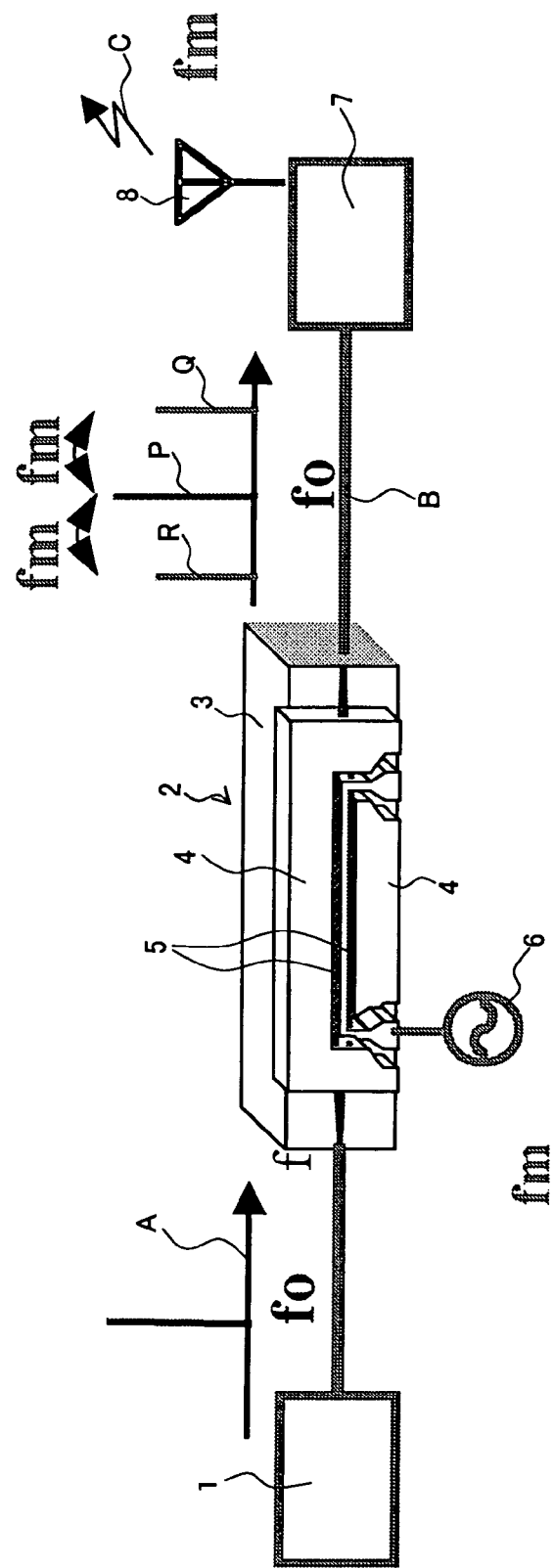
FIG. 2 is a block diagram showing a radio oscillation system according to an example of the present invention.
Figure 3:
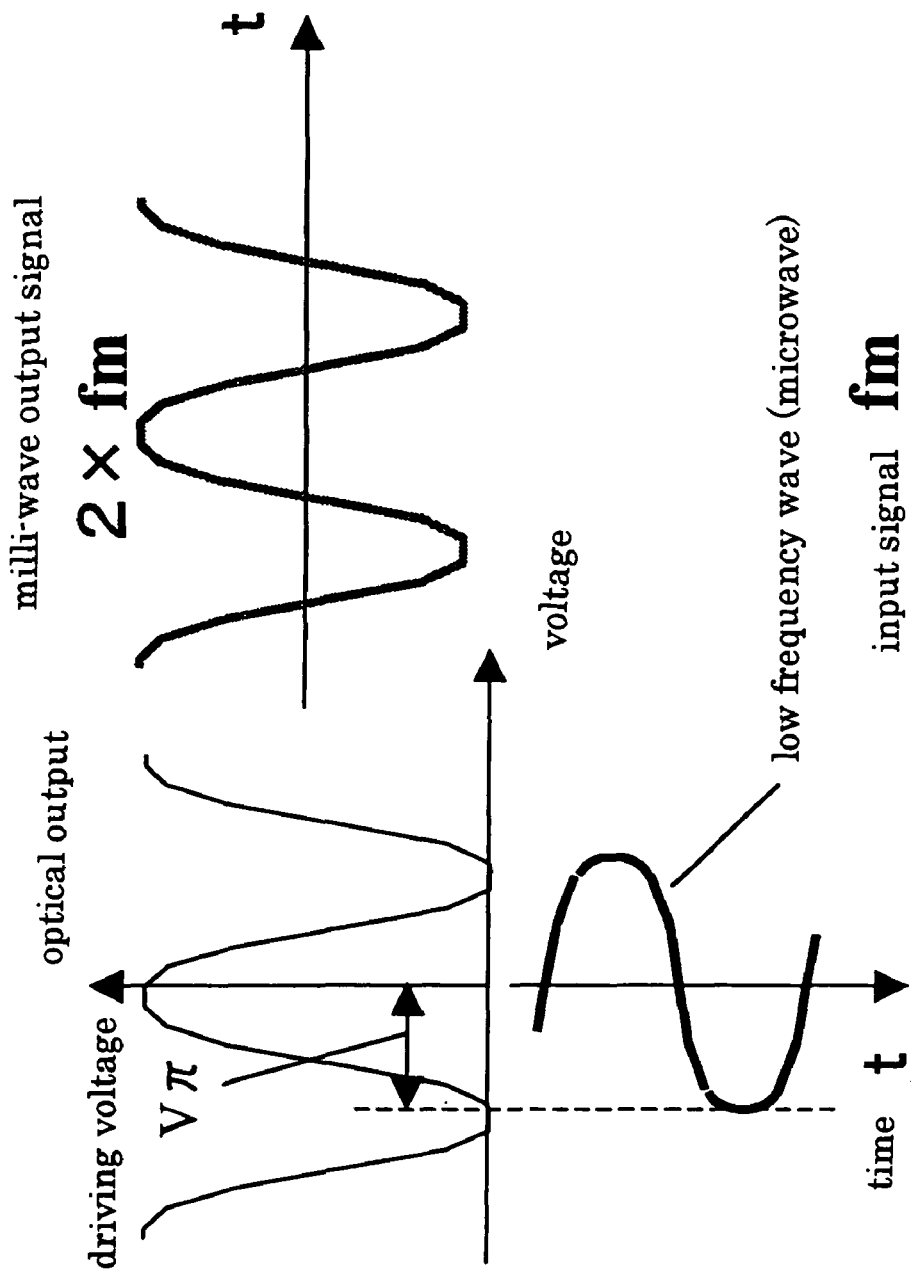
FIG. 3 is a schematic view showing properties of an optical modulator when it is used as a frequency multiplier.
Figure 4:
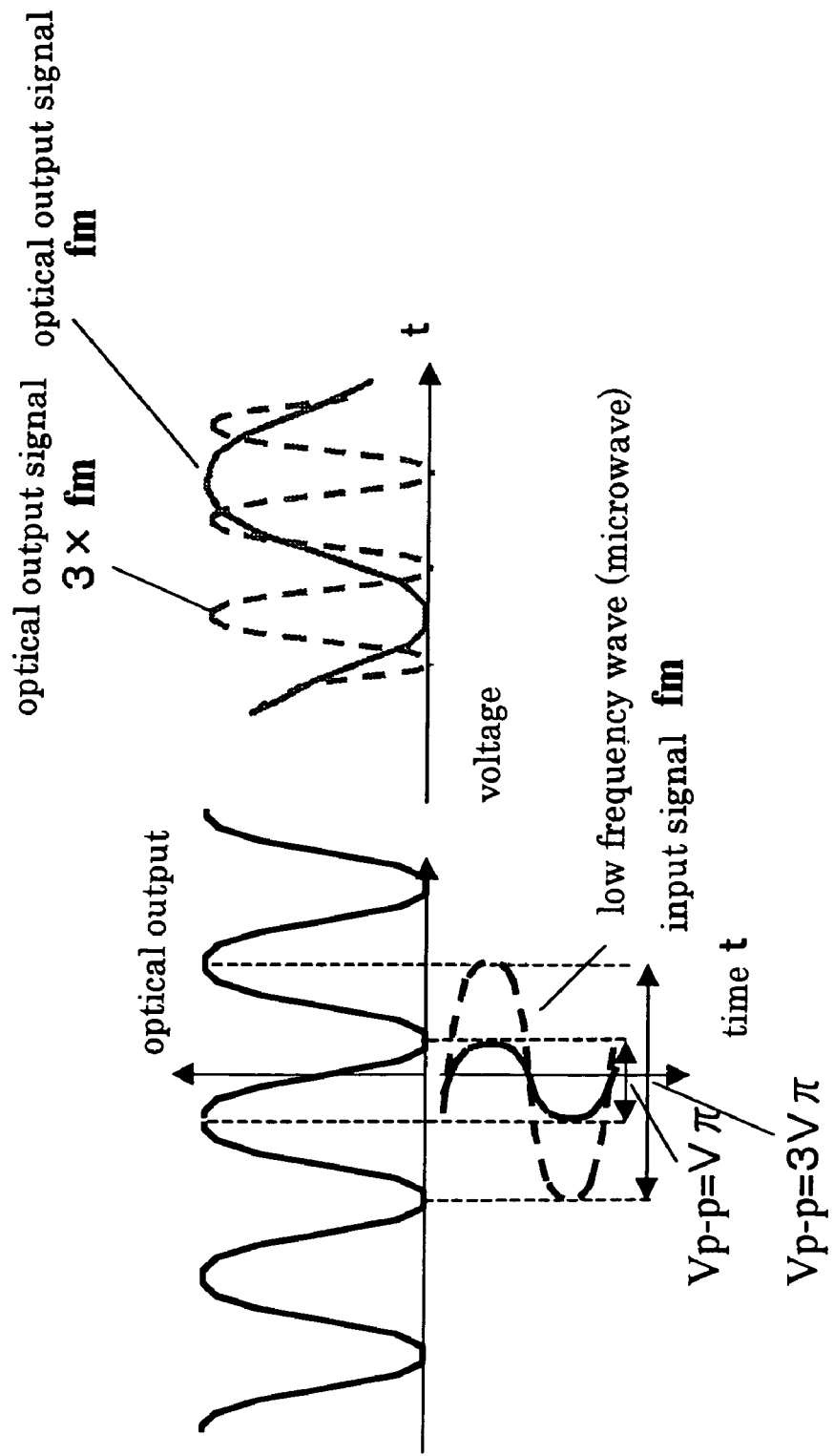
FIG. 4 is schematic diagram showing another property of an optical modulator when it is used as a frequency multiplier.

The optical modulator 2 was used to produce the radar system shown in FIG. 2. A DFB laser system of 1.55 μm was used as a light source. The optical modulator 2 was operated at the operational point that the power of the outgoing beam takes the maximum, that is, at an oscillating frequency of 15 GHz and an input voltage of 6.9 Vp-p. An optical receiver of an application band of 70 GHz was used to perform the opto-electric conversion and the wave forms were observed by means of a sampling oscilloscope. It was thus proved that sine wave of 60 GHz was oscillated.

Although the present invention has been described referring to specific embodiments, the present invention is not limited to the specific embodiments and may be performed with various changes and modifications without departing from the attached claims.

The invention claimed is:
1. A radar system comprising:
   a system for oscillating a radio signal, the radio oscillating system comprising;
      an optical modulator for oscillation,
      a modulating means for inputting a modulating signal of a frequency of fm into the optical modulator to modulate a carrier wave so as to superimpose sideband waves onto the carrier wave at positions shifted with respect to the frequency of the carrier wave by the frequency fm,
      an optical receiver for oscillation for receiving beam from the optical modulator and for converting the beam to an electrical signal, said optical receiver having a band higher than 2fm and lower than 4fm, and
      a radiating means for receiving the electrical signal output from the optical receiver and for radiating a radio signal of a frequency of 2fm based on the electrical signal without further inputting of the electrical signal into the optical modulator, wherein an input voltage Vp-p applied on the optical modulator is 1.0 times or more and 1.99 times or less of a half-wavelength voltage Vπ of the optical modulator; and receiving means for receiving a signal reflected from an object, wherein the received signal and the radio signal are input into signal processing means to obtain information concerning the object.

2. A radar system comprising:

a system for oscillating a radio signal, the radio oscillating system comprising;

an optical modulator for oscillation, a modulating means for inputting a modulating signal of a frequency of fm into the optical modulator to modulate a carrier wave so as to superimpose sideband waves onto the carrier wave at positions shifted with respect to the frequency of the carrier wave by the frequency fm, an optical receiver for oscillation for receiving beam from the optical modulator and for converting the beam to an electrical signal, said optical receiver having a band higher than 3fm and lower than 5fm, and a radiating means for receiving the electrical signal output from the optical receiver and for radiating a radio signal of a frequency of 3fm based on the electrical signal without further inputting of the electrical signal into the optical modulator, wherein an input voltage Vp-p applied on the optical modulator is 2.2 times or more and 2.7 times or less of a half-wavelength voltage Vπ of the optical modulator; and receiving means for receiving a signal reflected from an object, wherein the received signal and the radio signal are input into signal processing means to obtain information concerning the object.

3. A radar system comprising:

a system for oscillating a radio signal, the radio oscillating system comprising;

an optical modulator for oscillation, a modulating means for inputting a modulating signal of a frequency of fm into the optical modulator to modulate a carrier wave so as to superimpose sideband waves onto the carrier wave at positions shifted with respect to the frequency of the carrier wave by the frequency fm, a optical receiver for oscillation for receiving beam from the optical modulator and for converting the beam to an electrical signal, said optical receiver having a band higher than 4fm and lower than 6fm, and a radiating means for receiving the electrical signal output from the optical receiver and for radiating a radio signal of a frequency of 4fm based on the electrical signal without further inputting the electrical signal into the optical modulator, wherein an input voltage Vp-p applied on the optical modulator is 2.9 times or more and 3.6 times or less of a half-wavelength voltage Vπ of the optical modulator; and receiving means for receiving a signal reflected from an object, wherein the received signal and the radio signal are input into signal processing means to obtain information concerning the object.

4. A radar system comprising:

a system for oscillating a radio signal, the radio oscillating system comprising;

an optical modulator for oscillation, a modulating means for inputting a modulating signal of a frequency of fm into the optical modulator to modulate a carrier wave so as to superimpose sideband waves onto the carrier wave at positions shifted with respect to the frequency of the carrier wave by the frequency fm, an optical receiver for oscillation for receiving beam from the optical modulator and for converting the beam to an electrical signal, said optical receiver having a band higher than 5fm and lower than 7fm, and a radiating means for receiving the electrical signal output from the optical receiver and for radiating a radio signal of a frequency of 5fm based on the electrical signal without further inputting the electrical signal into the optical modulator, wherein an input voltage Vp-p applied on the optical modulator is 3.7 times or more and 4.7 times or less of a half-wavelength voltage Vπ of the optical modulator; and receiving means for receiving a signal reflected from an object, wherein the received signal and the radio signal are input into signal processing means to obtain information concerning the object.

5. The radar system of claim 4, further comprising a high path filter having a band higher than 3 fm.

6. A radar system comprising:

a system for oscillating a radio signal, the radio oscillating system comprising;

an optical modulator for oscillation, a modulating means for inputting a modulating signal of a frequency of fm into the optical modulator to modulate a carrier wave so as to interpose sideband waves onto the carrier wave at positions shifted with respect to the frequency of the carrier wave by the frequency fm, an optical receiver for oscillation for receiving beam from the optical modulator and for converting the beam into an electrical signal, said optical receiver having a band higher than 6fm and lower than 8fm, and a radiating means for receiving the electrical signal output from the optical receiver and for radiating a radio signal of a frequency of 6fm based on the electrical signal without further inputting the electrical signal into the optical modulator, wherein an input voltage Vp-p applied on the optical modulator is 4.5 times or more and 5.2 times or less of a half-wavelength voltage Vπ of the optical modulator; and receiving means for receiving a signal reflected from an object, wherein the received signal and the radio signal are input into signal processing means to obtain information concerning the object.

7. The radar system of claim 6, further comprising a high path filter having a band of higher than 4 fm.

* * * * *